(12) United States Patent  
Sutherlin et al.

(10) Patent No.: US 9,662,740 B2  
(45) Date of Patent: *May 30, 2017

(54) METHOD FOR MAKING CORROSION RESISTANT FLUID CONDUCTING PARTS

(71) Applicant: ATI Properties, Inc., Albany, OR (US)

(72) Inventors: Richard C. Sutherlin, Albany, OR (US); Brett J. Herb, Salem, OR (US); Ronald A. Graham, Salem, OR (US)

(73) Assignee: ATI Properties LLC, Albany, OR (US)

( * ) Notice: Subject to any disclaimer, the term of this patent is extended or adjusted under 35 U.S.C. 154(b) by 206 days.

This patent is subject to a terminal disclaimer.

(21) Appl. No.: 14/608,558

(22) Filed: Jan. 29, 2015

(65) Prior Publication Data

US 2015/0144681 A1    May 28, 2015

Related U.S. Application Data

(63) Continuation of application No. 12/839,618, filed on Jul. 20, 2010, now Pat. No. 8,973,810, which is a  
(Continued)

(51) Int. Cl.  
*B23K 15/04* (2006.01)  
*B23K 13/01* (2006.01)  
(Continued)

(52) U.S. Cl.  
CPC ............... *B23K 15/04* (2013.01); *B01J 19/02* (2013.01); *B01J 19/2415* (2013.01); *B21C 23/085* (2013.01); *B21C 23/22* (2013.01); *B23K 13/01* (2013.01); *B23K 15/0006* (2013.01); *B23K 20/10* (2013.01); *B23K 20/129* (2013.01);  
(Continued)

(58) Field of Classification Search  
CPC B01J 19/02; B01J 19/2415; B01J 2219/0236; B01J 2219/0277; B21C 23/085; B21C 23/22; B23K 13/01; B23K 15/0006; B23K 15/04; B23K 20/10; B23K 20/129; B23K 20/233; B23K 2203/05; B23K 2203/08; B23K 2203/14; B23K 2203/18  
USPC .......... 228/173.1, 173.2, 127, 193; 428/586; 29/516, 508, 726.5, 726, 890.032, 890.03  
See application file for complete search history.

(56) References Cited

U.S. PATENT DOCUMENTS 627,289 A    6/1899  Bennett  
1,346,188 A    7/1920  Fahrenwald  
(Continued)

FOREIGN PATENT DOCUMENTS

CA    2224586 A1    1/1997  
CN    102330850 A    1/2012  
(Continued)

OTHER PUBLICATIONS

US 9,278,382, 03/2016, Fonte et al. (withdrawn)  
(Continued)

*Primary Examiner* — Scott Kastler  
*Assistant Examiner* — Michael Aboagye  
(74) *Attorney, Agent, or Firm* — K&L Gates LLP

(57) ABSTRACT

A method for making a tube is described in which a multi-layer billet is extruded to provide a tube having a wall comprising an inner layer metallurgically bonded to an outer layer.

27 Claims, 8 Drawing Sheets

Related U.S. Application Data continuation of application No. 11/061,355, filed on Feb. 18, 2005, now Pat. No. 7,922,065.

(60) Provisional application No. 60/598,228, filed on Aug. 2, 2004.

(51) Int. Cl.

| | | |
|---|---|---|
| *H05B 6/10* | (2006.01) | |
| *F16L 9/18* | (2006.01) | |
| *B23K 15/00* | (2006.01) | |
| *B24C 1/00* | (2006.01) | |
| *B23K 31/02* | (2006.01) | |
| *C22F 1/18* | (2006.01) | |
| *B01J 19/02* | (2006.01) | |
| *B01J 19/24* | (2006.01) | |
| *F28F 9/18* | (2006.01) | |
| *F28F 11/00* | (2006.01) | |
| *F28F 19/06* | (2006.01) | |
| *B21C 23/08* | (2006.01) | |
| *B21C 23/22* | (2006.01) | |
| *B23K 20/10* | (2006.01) | |
| *B23K 20/12* | (2006.01) | |
| *B23K 20/233* | (2006.01) | |
| *B23K 103/18* | (2006.01) | |
| *B23K 103/08* | (2006.01) | |
| *B23K 103/14* | (2006.01) | |
| *B23K 103/04* | (2006.01) | |

(52) U.S. Cl.
CPC .......... *B23K 20/233* (2013.01); *B23K 31/027* (2013.01); *B24C 1/003* (2013.01); *C22F 1/183* (2013.01); *C22F 1/186* (2013.01); *F16L 9/18* (2013.01); *F28F 9/18* (2013.01); *F28F 11/00* (2013.01); *F28F 19/06* (2013.01); *H05B 6/10* (2013.01); *B01J 2219/0236* (2013.01); *B01J 2219/0277* (2013.01); *B23K 2203/05* (2015.10); *B23K 2203/08* (2013.01); *B23K 2203/14* (2013.01); *B23K 2203/18* (2013.01); *F28F 2275/062* (2013.01); *Y02P 20/142* (2015.11); *Y10T 29/4935* (2015.01); *Y10T 428/12292* (2015.01); *Y10T 428/31808* (2015.04)

(56) References Cited

U.S. PATENT DOCUMENTS

| | | |
|---|---|---|
| 1,365,987 A | 1/1921 | Hadfield et al. |
| 1,384,718 A | 7/1921 | Guy |
| 1,553,825 A | 9/1925 | Langenberg |
| 1,602,282 A | 10/1926 | Methlin |
| 2,104,319 A | 1/1938 | Dicke |
| 2,222,579 A | 11/1940 | Wolcott |
| 2,392,797 A | 1/1946 | Hackett |
| 2,541,114 A | 2/1951 | Somes |
| 2,541,116 A | 2/1951 | Somes |
| 2,876,095 A | 3/1959 | Dickerson |
| 2,990,342 A | 6/1961 | Sullivan |
| 3,017,793 A | 1/1962 | Appel |
| 3,091,022 A | 5/1963 | Faulkner |
| 3,516,326 A | 6/1970 | Donner |
| 3,568,723 A | 3/1971 | Sowards |
| 3,571,962 A | 3/1971 | Eig |
| 3,604,102 A | 9/1971 | Boccalari et al. |
| 3,626,570 A | 12/1971 | Kushnir et al. |
| 3,660,177 A | 5/1972 | Brown et al. |
| 3,753,286 A | 8/1973 | Lilly et al. |
| 3,780,555 A | 12/1973 | Balthazar et al. |
| 3,798,011 A | 3/1974 | Sharp, Jr. |
| 3,962,767 A | 6/1976 | Byerley et al. |
| 3,969,155 A | 7/1976 | McKeighen |
| 4,028,785 A | 6/1977 | Jackson et al. |
| 4,161,112 A | 7/1979 | Stump |
| 4,200,492 A | 4/1980 | Armijo et al. |
| 4,210,600 A | 7/1980 | Zardi |
| 4,317,271 A | 3/1982 | Chakravarti |
| 4,319,121 A | 3/1982 | Yoshida |
| 4,359,352 A | 11/1982 | Ray et al. |
| 4,409,881 A | 10/1983 | van der Wielen |
| 4,411,569 A | 10/1983 | Pizzola |
| 4,417,459 A | 11/1983 | Tomita |
| 4,465,524 A | 8/1984 | Dearnaley et al. |
| 4,478,787 A | 10/1984 | Nadkarni et al. |
| 4,482,398 A | 11/1984 | Eylon et al. |
| 4,518,111 A | 5/1985 | Hardwick |
| 4,571,969 A | 2/1986 | Tomita |
| 4,573,629 A | 3/1986 | Imahashi et al. |
| 4,609,524 A | 9/1986 | Ferrari |
| 4,622,080 A | 11/1986 | Wegwerth |
| 4,638,712 A | 1/1987 | Chawla et al. |
| 4,669,212 A | 6/1987 | Jackson et al. |
| 4,690,716 A | 9/1987 | Sabol et al. |
| 4,747,225 A | 5/1988 | Gstettner et al. |
| 4,751,044 A | 6/1988 | Hwang et al. |
| 4,756,677 A | 7/1988 | Hribernik et al. |
| 4,761,346 A | 8/1988 | Naik |
| 4,765,174 A | 8/1988 | Cook et al. |
| 4,819,471 A | 4/1989 | Cook |
| 4,846,392 A | 7/1989 | Hinshaw |
| 4,889,776 A | 12/1989 | Priceman |
| 4,899,813 A | 2/1990 | Menicatti et al. |
| 4,903,887 A | 2/1990 | Thrower |
| 4,911,060 A | 3/1990 | Greenspan et al. |
| 4,995,548 A | 2/1991 | Wang et al. |
| 5,004,529 A | 4/1991 | Vishnitsky |
| 5,056,209 A | 10/1991 | Ohashi et al. |
| 5,111,990 A | 5/1992 | Thrower et al. |
| 5,154,780 A | 10/1992 | Premkumar |
| 5,160,802 A | 11/1992 | Moscrip |
| 5,228,427 A | 7/1993 | Gardner, Jr. |
| 5,259,547 A * | 11/1993 | Hardwick ............ B23K 20/085 228/107 |
| 5,261,591 A | 11/1993 | Hardwick |
| 5,285,485 A | 2/1994 | Rosenbaum et al. |
| 5,341,719 A | 8/1994 | Bullis et al. |
| 5,344,508 A | 9/1994 | Gilman et al. |
| 5,383,228 A | 1/1995 | Armijo et al. |
| 5,419,791 A | 5/1995 | Folmer |
| 5,434,897 A | 7/1995 | Davies |
| 5,469,481 A | 11/1995 | Adamson et al. |
| 5,470,373 A | 11/1995 | Edelstein et al. |
| 5,483,563 A | 1/1996 | Herb |
| 5,517,540 A | 5/1996 | Marlowe et al. |
| 5,524,032 A | 6/1996 | Adamson et al. |
| 5,558,150 A | 9/1996 | Sponseller |
| 5,579,988 A | 12/1996 | Schutz et al. |
| 5,584,428 A | 12/1996 | Satoh et al. |
| 5,620,536 A | 4/1997 | Dahlbäck |
| 5,649,440 A | 7/1997 | Arnautu et al. |
| 5,657,659 A | 8/1997 | Yamada |
| 5,699,955 A | 12/1997 | Shimizu et al. |
| 5,856,631 A | 1/1999 | Julien |
| 5,928,799 A | 7/1999 | Sherman et al. |
| 5,935,351 A | 8/1999 | Sherman et al. |
| 6,010,669 A | 1/2000 | Miola et al. |
| 6,038,901 A | 3/2000 | Stein et al. |
| 6,068,814 A | 5/2000 | Kang et al. |
| 6,129,795 A | 10/2000 | Lehockey et al. |
| 6,167,794 B1 | 1/2001 | Kathe |
| 6,298,764 B1 | 10/2001 | Sherman et al. |
| 6,318,738 B1 | 11/2001 | Abkowitz et al. |
| 6,324,831 B1 | 12/2001 | Izadi et al. |
| 6,350,327 B2 | 2/2002 | Neill |
| 6,363,867 B1 | 4/2002 | Tsilevich |
| 6,386,010 B1 | 5/2002 | Irie et al. |
| 6,412,684 B1 | 7/2002 | Miola |
| 6,419,768 B1 | 7/2002 | Tverberg |
| 6,422,010 B1 | 7/2002 | Julien |
| 6,464,804 B2 | 10/2002 | Goecmen et al. |

(56) References Cited

U.S. PATENT DOCUMENTS

| | | | |
|---|---|---|---|
| 6,523,385 B2 | 2/2003 | Häusler | |
| 6,564,689 B1 | 5/2003 | Billgren | |
| 6,594,936 B1 | 7/2003 | Sniezak et al. | |
| 6,615,702 B1 | 9/2003 | Julien | |
| 6,691,397 B2 | 2/2004 | Chakravarti | |
| 6,810,615 B2 | 11/2004 | Hermanson et al. | |
| 6,880,220 B2 | 4/2005 | Gandy | |
| 6,887,356 B2 | 5/2005 | Ford et al. | |
| 6,908,516 B2 | 6/2005 | Hehmann et al. | |
| 6,913,791 B2 | 7/2005 | Burca et al. | |
| 6,923,900 B2 | 8/2005 | Jones et al. | |
| 6,931,776 B2 | 8/2005 | Wagner et al. | |
| 7,093,340 B2 | 8/2006 | Groll | |
| 7,448,243 B1 | 11/2008 | Motsenbocker | |
| 7,482,065 B2 | 1/2009 | Branagan | |
| 7,520,947 B2 | 4/2009 | Kennedy et al. | |
| 7,596,848 B2 | 10/2009 | Urech et al. | |
| 7,601,232 B2 | 10/2009 | Fonte et al. | |
| 7,721,478 B2 | 5/2010 | Withers et al. | |
| 7,765,846 B2 | 8/2010 | Stueckrad et al. | |
| 7,818,986 B1 | 10/2010 | Parker et al. | |
| 7,921,590 B2 | 4/2011 | Briggs et al. | |
| 7,922,065 B2 * | 4/2011 | Sutherlin | B01J 19/02 228/112.1 |
| 7,934,332 B2 | 5/2011 | Briggs | |
| 7,963,202 B1 | 6/2011 | Becker et al. | |
| 8,075,839 B2 | 12/2011 | Srivastava | |
| 8,302,341 B2 | 11/2012 | Fonte | |
| 8,388,890 B2 | 3/2013 | Hilty et al. | |
| 8,418,392 B2 | 4/2013 | Carter et al. | |
| 8,479,549 B1 | 7/2013 | Fonte | |
| 8,671,609 B2 | 3/2014 | Fonte | |
| 8,869,443 B2 | 10/2014 | Fonte | |
| 8,910,409 B1 | 12/2014 | Fonte | |
| 8,973,810 B2 * | 3/2015 | Sutherlin | B01J 19/02 228/193 |
| 9,186,726 B2 | 11/2015 | Keane et al. | |
| 9,375,771 B2 | 6/2016 | Fonte et al. | |
| 2002/0121119 A1 | 9/2002 | Baensch et al. | |
| 2003/0019269 A1 | 1/2003 | Rolf | |
| 2004/0105999 A1 | 6/2004 | Abkowitz et al. | |
| 2005/0066801 A1 | 3/2005 | Hermanson et al. | |
| 2005/0076975 A1 | 4/2005 | Lopez et al. | |
| 2005/0194073 A1 | 9/2005 | Hamano et al. | |
| 2005/0279630 A1 | 12/2005 | Fonte | |
| 2006/0288854 A1 | 12/2006 | Witherell et al. | |
| 2007/0059460 A1 | 3/2007 | Abney et al. | |
| 2008/0142268 A1 | 6/2008 | Downton et al. | |
| 2008/0280691 A1 | 11/2008 | Stueckrad et al. | |
| 2009/0217812 A1 | 9/2009 | Whitaker et al. | |
| 2010/0236122 A1 | 9/2010 | Fonte | |
| 2012/0031516 A1 | 2/2012 | Yori et al. | |
| 2014/0353291 A1 | 12/2014 | Gould et al. | |
| 2016/0033059 A1 | 2/2016 | Fonte | |

FOREIGN PATENT DOCUMENTS

| | | |
|---|---|---|
| EP | 0057867 A1 | 1/1982 |
| EP | 0233437 A1 | 8/1987 |
| EP | 0614712 A1 | 9/1994 |
| EP | 0911106 A1 | 4/1999 |
| EP | 0965410 A2 | 12/1999 |
| EP | 1164180 A2 | 12/2001 |
| EP | 1577631 A1 | 9/2005 |
| EP | 1577632 A1 | 9/2005 |
| FR | 1431998 A | 3/1966 |
| GB | 974590 | 11/1964 |
| GB | 1168265 | 10/1969 |
| GB | 1220796 | 1/1971 |
| GB | 1235182 | 6/1971 |
| GB | 1478962 | 7/1977 |
| GB | 2256910 A | 12/1992 |
| JP | S54-46163 A | 4/1979 |
| JP | S54-149012 A | 11/1979 |
| JP | S55-152301 A | 11/1980 |
| JP | S56-68657 A | 6/1981 |
| JP | S56-148486 A | 11/1981 |
| JP | S59-39414 A | 3/1984 |
| JP | S59-185724 A | 10/1984 |
| JP | 60-030588 A1 | 2/1985 |
| JP | 60-238492 A | 11/1985 |
| JP | S62-220212 | 9/1987 |
| JP | S62-224420 A | 10/1987 |
| JP | S63-49082 U | 4/1988 |
| JP | S63-286288 A | 11/1988 |
| JP | S64-2787 A | 1/1989 |
| JP | S64-71582 A | 3/1989 |
| JP | 1-130822 A | 5/1989 |
| JP | H01-152400 A | 6/1989 |
| JP | H2-134485 A | 5/1990 |
| JP | H2-179314 A | 7/1990 |
| JP | H2-228468 A | 9/1990 |
| JP | H2-247302 A | 10/1990 |
| JP | H03-36205 A | 2/1991 |
| JP | H4-182023 A | 6/1992 |
| JP | H5-185248 A | 7/1993 |
| JP | H6-10919 A | 1/1994 |
| JP | H6-27027 A | 4/1994 |
| JP | H6-55076 A | 7/1994 |
| JP | H7-9167 A | 1/1995 |
| JP | H7-27884 A | 1/1995 |
| JP | H07-32167 A | 2/1995 |
| JP | H10-231267 A | 9/1998 |
| JP | H11-180942 A | 7/1999 |
| JP | 2003-1427 A | 1/2003 |
| JP | 2004-243354 A | 9/2004 |
| JP | 2007-217716 A | 8/2007 |
| JP | 2009-30095 A | 2/2009 |
| NE | 6412699 | 10/1965 |
| WO | WO 94/01600 A1 | 1/1994 |
| WO | WO 97/01057 A1 | 1/1997 |
| WO | WO 02/099352 A1 | 12/2002 |
| WO | WO 03/095060 A1 | 11/2003 |
| WO | WO 2004/061159 A2 | 7/2004 |
| WO | WO 2010/073476 A1 | 7/2010 |

OTHER PUBLICATIONS

Patent Abstracts of Japan, Pub. No. 05-093249, related to App. No. JP 03-022791, published Apr. 16, 1993.

Patent Abstracts of Japan, Pub. No. 05-093238, related to App. No. 03-273308, published Apr. 16, 1993.

Patent Abstracts of Japan, Pub. No. 58-179592, related to App. No. 57-054316, published Oct. 20, 1983.

Patent Abstracts of Japan, Pub. No. 60-089565, related to App. No. 58-197406, published May 20, 1985.

Patent Abstracts of Japan, Pub. No. 61-291958, related to App. No. 60-131435, published Dec. 22, 1986.

Patent Abstracts of Japan, Pub. No. 07-150556, related to App. No. 05-300081, published Jun. 13, 1995.

"Modernising Urea Plants: The Widening Appeal of Revamps", Fertilizer International, No. 339, Nov. 1994, pp. 28-33.

Bhowmik, "Materials of Construction in Urea Plant and the Areas where Maximum Corrosion Takes Place", Corrosion & Maintenance, Jan.-Mar. 1985, pp. 11-22.

McDowell, Jr., "Corrosion in Urea-Synthesis Reactors", Chemicals and Processes Pub. May 13, 1974, pp. 54-57.

Outlook, vol. 7, No. 1, Winter 1986, published by Teledyne Wah Chang Albany, 6 pages.

Holmes et al., "Welding Zirconium to Titanium" in Outlook, vol. 24, No. 3, Third Quarter 2003, published ATI Wah Chang.

Outlook, "Explosive welding: principles and potentials" and "Key Welding Processes and Parameters for Zirconium and Other Reactive Metals", "Q&A: Working With Ti-45Nb", vol. 15, No. 2, 2nd Quarter 1994, published by Teledyne Wah Chang.

Condliff, "The Production of Zirconium-Lined Titanium—3%Al-2.5%V Pipe and Tube for Industrial Applications", Proceedings of Sixth World Conference on Titanium, France, 1988, pp. 1379-1384.

Tersmeden, "Bimetallic tubing as an answer to process tubing corrosion", Anti-Corrosion Methods and Materials (vol. 44, No. 4, 1997), pp. 269-270.

(56) References Cited

OTHER PUBLICATIONS

"Experimental Investigation of the Vapour-Liquid Equilibrium of the Carbon Dioxide-Ammonia-Water System at Urea Synthesis Conditions", Chimia, 33, No. 8, Aug. 1979, pp. 293-299.
Yau, Te-Lin, "Performance of Zirconium and Zirconium Alloys in Organics", J. of Testing and Evaluation, vol. 24, No. 2, Mar. 1996, pp. 110-118.
Miola et al., "Use of Bimetallic Tubes in Urea Strippers", Ammonia Technical Manual, 1996, vol. 36, pp. 254-258.
Banker and Nobili, "Zirconium Explosion Clad for Cost Effective Process Equipment: Applications, Design, Fabrication", published in Proceedings of 1997 Zirconium/Organics Conference, Wah Chang Corp., Sep. 1997, pp. 71-78.
Outlook, Teledyne Wah Chang Albany, vol. 13, No. 2, Spring 1992, 12 pages.
Outlook, Teledyne Wah Chang, vol. 16, No. 1, 1995, Te-Lin Yau, pp. 1-12.
Nobili et al., "Recent Developments in Characterization of a Titanium-Steel Explosion Bond Interface", published in Proceedings of Reactive Metals in Corrosive Applications Conference, Wah Chang, Albany, OR, Sep. 1999, 15.
Nobili et al., "Continuing Innovation in Zirconium Explosion Clan Manufacturing", presented at Wah Chang Reactive Metal Conference, Sep. 12, 2001, pp. 1-9.
"Zr Outlook", Teledyne Wah Chang Albany, vol. 4, No. 2, Spring 1983, printed from http://www.wahchang.com/WahChang/pages/outlook/html/bkissues/04_02.htm on Apr. 13, 2005, 9 pages.
"Solid State Welding", printed from http://key-to-metals.com/PrintArticle.asp?ID=51 on Apr. 13, 2005, 5 pages.
Booklet No. 5 of 8: Production of Urea and Urea Ammonium Nitrate, European Fertilizer Manufacturers Association, article printed from http://www.efma.org/Publication/BAT%2095/Bat05/section04.asp on Apr. 13, 2005, 15 pages.
"Interface Welding", commercial website pages printed from http://www.interfacewelding.com/ on Apr. 13, 2005, 10 pages.
Tsang S., "Friction Welding", ASM Handbook, vol. 6, ASM International, 1993, pp. 315-317.
Nicholas, E.D., "Radial Friction Welding", ASM Handbook, vol. 6, ASM International, 1993, pp. 318-320.
Elmer et al., "Fundamentals of Friction Welding", ASM Handbook, vol. 6, ASM International, 1993, pp. 150-155.
Satyro et al., "Modeling Urea Processes: A New Thermodynamic Model of Software Integration Paradigm", printed from Online Chemical Engineering Information at cheresources.com, presented at The Chemical Engineers' Resource Page, Aug. 14, 2004, 20 pages.
Lison, R., "Advanced Application, Spin Welding for Special Metals", Industrie Anzeiger Extra, pp. 73-75 (undated).
ASM Committee on Explosion Welding, "Explosion Welding", pp. 705-718 (undated).
Schwartz, M. M., "Metals Joining Manual", McGraw-Hill, New York, 1979, 62 pages.
Dornfeld, W.H., "Thick-Walled Cylinders and Press Fits", 2004 Retrieved from stressanalysis.ueuo.com/PressCylinderHam.pdf on Aug. 8, 2012, 17 pages.
International Tube, "Tubing Terms", Retrieved on Aug. 6, 2012 from www.internationaltube.com/files/glossary.pdf, 18 pages.
Michel, D.J. et al., "Mechanical Properties and Microstructure of Centrifugally Cast Alloy 718," Metallurgical Transactions A, vol. 16A, pp. 1295-1306, Jul. 1985.
Glasier et al., "Precission Seamless Cylinders by the Roll Extrusion Process", Kaiser Rollmet, A Kaiser Aerospace & Electronics Co., American Institute of Aeronautics and Astronautics, 20th Joint Propulsion Conference, Cincinnati, Ohio, Jun. 1984, 7 pages.
Standard Specification for Seamless, Welded, and Heavily Cold Worked Austenitic Stainless Steel Pipes, Designation A 312/A 312M-06, ASTM International, May 2006, 11 pages.
Corn, David L., "Roll Extruding Precision", Metal Progress, Jun. 1977, pp. 78-81.

"White Paper Autofrettage," Maximator Test, LLC, Jul. 2, 2009, 4 pages.
Aguayo et al., "Elastic Stability and Electronic Structure of fcc Ti, Zr, and Hf: A First-principles Study," Physical Review B, vol. 65, 092106, 4 pages, Feb. 2002.
Alegre et al., "Fatigue design of wire-wound pressure vessels using ASME-API 579 procedure," Eng Fail Anal, pp. 1-12, 2009.
Andrews et al., "Hydraulic Testing of Ordnance Components," ASME, vol. 128, pp. 162-167, May 2006.
Burton et al., "Army Materials Research: Transforming Land Combat Through New Technologies," AMPTIAC Quarterly, vol. 8, No. 4, 10 pages, 2004.
Del Corso, "Effect of Cold Drawing & Heat Treating on Powder Metallurgy Processed ASTM F 1537 Alloy 1 & Alloy 2 Barstock," Carpenter Technology Corporation, Reading, PA, 6 pages, 2003.
Gloaguen et al., "Measurement and Prediction of Residual Stresses and Crystallographic Texture Development in Rolled Zircaloy-4 Plates: X-ray Diffraction and the Self-Consistent Model," Acta Materialia, vol. 55, pp. 4369-4379, 2007.
Janaki Ram et al., "Microstructure and Wear Properties of LENS@ Deposited medical Grade CoCrMo," J. Mater Sci: Mater Med, vol. 19, pp. 2105-2111, 2008.
Mani Krishna et al., "Microstructural and Textural Developments During Zircaloy-4 Fuel Tube Fabrication," Journal of Nuclear Materials, vol. 383, pp. 78-85, 2008.
Mani-Medrano et al., "Effect of Plastic Deformation on the Isothermal FCC/HCP Phase Transformation During Aging of Co—27Cr—5Mo—0.05C Alloy," Materials Science Forum, vol. 560, pp. 23-28, 2007.
Montero-Ocampo et al., "Effect of Fcc-Hcp Phase Transformation Produced by Isothermal Aging on the Corrosion Resistance of a Co—27CR—5Mo—0.05C Alloy," Metallurgical and Materials Transactions A, vol. 33A, pp. 2229-2235, Jul. 2002.
Opris et al., "Development of Stellite Alloy Composites with Sintering/HIPing Technique for Wear-Resistant Applications," Materials & Design, vol. 28, pp. 581-591, 2007.
Parker et al., "Residual Stresses and Lifetimes of Tubes Subjected to Shrink Fit Prior to Autofrettage," ASME, vol. 125, pp. 282-286, Aug. 2003.
Paul et al., "Hot Working Characteristics of Cobalt in the Temperature Range 600-950° C.," Scripta Materialia, vol. 60, pp. 104-107, 2009.
Perry et al., "The Influence of the Bauschinger Effect on the Yield Stress, Young's Modulus, and Poisson's Ratio of a Gun Barrel Steel," Journal of Pressure Vessel Technology, vol. 128, pp. 179-184, May 2006.
Robertson et al., "Crystallographic Texture for Tube and Plate of the Superelastic/Shape-Memory Alloy Nitinol Used for Endovascular Stents," Wiley InterScience, pp. 190-199, 2004.
Robertson et al., "Effect of Product Form and Heat Treatment on the Crystallographic Texture of Austenitic Nitinol," J. Mater Sci, vol. 41, pp. 621-630, 2006.
Theaker et al., "Development of Crystallographic Texture in CANDU Calandria Tubes," Thirteenth International Symposium, ASTM STP, pp. 445-464, 2002.
Yu et al., "A Comparison of the Tribo-Mechanical Properties of a Wear Resistant Cobalt-Based Alloy Produced by Different Manufacturing Processes," Transactions of the ASME, vol. 129, pp. 586-594, Jul. 2007.
PMF Industries, Understanding Flowforming web archived Oct. 13, 2004 (http://web.archive.org/web/20041013173007/http://www.pmfind.com/Flowforming/Flowforming/Flowforming-6-04.pdf).
McMullen, "Application of Sub-Models to Explore Geometric Effects in Medium Caliber Gun Barrels," Concurrent Technologies Corporation (Date Unknown), 19 pages.
Antunes et al., "Influence of Stress State on High Temperature Fatigue Crack Growth in Inconel 718," Fatigue & Fracture of Engineering Materials & Structures, 24 (2001), pp. 127-135.
Koch et al., "Seamless Thin-Walled TiAl6V4 Tubes Manufactured by Flow-Forming Process," Titanium '92, Science and Technology, The Minerals, Metals & Materials Society (1993), pp. 1429-1436.

(56) References Cited

OTHER PUBLICATIONS

Rifling by Flow Forming: A New Developed Method for Rifling Barrels, 2007, (http://www.macdor.com/technical_documents/Rifling_by_flow_forming.pdf).
Rifling: Facts, Discussion Forum, and Encyclopedia Article, printed Jun. 16, 2009, (http://www.absoluteastronomy.com/topics/Rifling).
Solicitation/Contract/Order for Commercial Items, Contract No. W15QKN-04-M-0184, Award/Effective Date: Apr. 23, 2004, 2 pages.
Amendment of Solicitation/Modification of Contract, Amendment/Modification No. W15QKN-04-M-0184, Effective Date: Jul. 29, 2004, 3 pages.
Solicitation/Contract/Order for Commercial Items, Contract No. W15QKN-05-P-0123, Award/Effective Date: Mar. 10, 2005, 11 pages.
Solicitation/Contract/Order for Commercial Items, Contract No. W15QKN-05-P-0248, Award/Effective Date: Apr. 21, 2005, 10 pages.
Amendment of Solicitation/Modification of Contract, Amendment/Modification No. W15QKN-05-P-0248, Effective Date: Aug. 22, 2005, 2 pages.
Solicitation/Contract/Order for Commercial Items, Contract No. W15QKN-05-P-0312, Award/Effective Date: Jun. 8, 2005, 12 pages.
Amendment of Solicitation/Modification of Contract, Amendment/Modification No. W15QKN-05-P-0312, Effective Date: Aug. 23, 2005, 2 pages.
Amendment of Solicitation/Modification of Contract, Amendment/Modification No. W15QKN-05-P-0312, Effective Date: Oct. 25, 2005, 2 pages.
Drawings for Contract No. W15QKN-04-M-0184, Release Date: Jul. 7, 2004, 2 pages.
Drawings for Contract No. W15QKN-04-M-0184, Release Date: Nov. 2, 2004, 2 pages.
DeFries, Richard S., "Hydrostatic Extrusion of 60MM Mortar Tubes," National Technical Information Service, Oct. 1974.
Gourley, Scott R., "Mortar Technology, Special Operations Technology, Online Edition", retrieved from Internet Dec. 12, 2007: http://www.special-operations-technology.com/article.cfm?DocID=2051, pp. 1-6.
Harlow et al., "Development of an Electrochemical Machining Process for Rifling Lined Gun Barrels," Defense Technical Information Center, Dec. 1972, retrieved from Internet: http://stinet.dtic.mil/oai?&verb=getRecord&metadataPrefix=html&identifier=AS0909379, 1 page.
Kim et al., "Effect of Thermo-Mechanical Treatment on Mechanical Properties and Shape Behavior of Ti-(26-28) at % Nb Alloys", Materials Science and Engineering A, Feb. 6, 2006, pp. 839-843.
Lee et al., "Structure-Property Relationship of Cast Ti—Nb Alloys", Journal of Oral Rehabilitation, Department of Materials Science and Engineering, Blackwell Science Ltd., vol. 29, 2002, pp. 314-322.
Powell, G. W., "Evaluation of Alloys for Use in 81-mm Mortar Tubes; Elevated-Temperature Failures," Failure Analysis and Prevention, vol. 11, ASM Handbook, ASM International, 1986, pp. 263-297.
Drennen et al., "Rotary Swaged Rapid-Fire Gun Barrels", Battelle Memorial Institute, 100 pages, Aug. 1972.
Tillack et al., "Heat Treating of Nickel Alloys", adapted from Heat Treating, ASM Handbook, ASM International, vol. 4, pp. 907-912, 1990.
Prevéy, "The Effect of Cold Work on the Thermal Stability of Residual Compression in Surface Enhanced IN718", Lambda Technologies, 20th ASM Materials Solutions Conference & Exposition, 9 pages, Oct. 10-12, 2000.
Frank, "Selection of Age-Hardenable Superalloys", 13 pages, Jun. 2005.
Cammett et al., "The Effect of Shot Peening Coverage on Residual Stress, Cold Work, and Fatigue in a Nickel-Base Superalloy", Lambda Technologies, Proceedings of ICSP 9, pp. 1-6, Sep. 6-9, 2005.
Liu et al., "Study of Residual Stresses in the Barrel Processed by the Radial Forging", 2009 Second International Conference on Information and Computing Science, IEEE Computer Society, pp. 131-134, 2009.
U.S. Appl. No. 14/103,483, filed Dec. 11, 2013.
U.S. Appl. No. 14/320,992, filed Jul. 1, 2014.
Chang, O.W., "Zirconium and Titanium Flowformed Products Offer Myriad of Advantages," Outlook, 1.sup.st Quarter, 1999.
Scutti, J. J., "Flowformed Titanium Tubular Products," Advanced Materials & Processes, Jan. 2001.
Klocke, F., et al., "Laser-Assisted Metal Spinning of Advanced Materials," Fraunhofer Institute of Production Technology IPT, pp. 1-5, 2003.
Fonte, V., "Flowforming of Thin-Walled Tubes and Cylinders," Dynamic Machine Works, Inc., 2001.
Statement regarding prior activities of Dynamic Machine Works, Inc., Oct. 19, 2005.
Da Silva et al., "Dynamic properties of NiTi shape memory alloy and classic structural materials: a comparative analysis", Materials Science Forum vol. 643, 2010, pp. 37-41.
Duerig, et al., Nitinol, Part 1, Mechanism and Behavior, Chapter 9, Alloying and Composition, SMST e-Elastic newsletter, Jan. 2011, ASM International, pp. 1-30.
Littlefield, Andrew and Eric Kathe, "Adaptive Gun Barrel Vibration Absorber", 2002, 12 pages.
NACE Standard MR0175-2000, Standard Material Requirements, Sulfide Stress Cracking Resistant Metallic Materials for Oilfield Equipment, NACE International, 2000, 42 pages.
American Petroleum Institute Specification 5LD "Specifications for CRA Clad or Lined Steel Pipe," 3d edition, 2009, 48 pages.
ASTM A264—12 Standard Specification for Stainless Chromium-Nickel Steel-Clad Plate, Section 7.2.1 Shear Strength, 2012, 6 pages.
U.S. Appl. No. 14/747,705, filed Jun. 23, 2015.
Practical Guidelines for the Fabrication of Duplex Stainless Steels, Nickel Institute, 2009, 64 pages.
American National Standards Institute / American Petroleum Institute Specification 5CRA "Specifications for Corrosion Resistant Alloy Seamless Tubes for Use as Casing, Tubing and Coupling Stock," 1st Edition, Feb. 2010, 101 pages.
Wilhelm et al., "Evaluation of Alloy 625 Steel Bimetallic Pipe for Petroleum Service", Superalloys 718, 625 and Various Derivatives, Ed. E. Loria, The Minerals, Metals & Materials Society, 1991, pp. 771-791.

\* cited by examiner

METHOD FOR MAKING CORROSION RESISTANT FLUID CONDUCTING PARTS

CROSS-REFERENCE TO RELATED APPLICATIONS

This patent application is a continuation application and claims the benefit of the filing date under 35 U.S.C. §120 of U.S. patent application Ser. No. 12/839,618, filed on Jul. 20, 2010, now U.S. Pat. No. 8,971,810 B2 (issued on Mar. 10, 2015), which is a continuation application and claims the benefit of the filing date under 35 U.S.C. §120 of U.S. patent application Ser. No. 11/061,355, filed on Feb. 18, 2005, now U.S. Pat. No. 7,922,065 B2 (issued on Apr. 12, 2011), which claims priority under 35 U.S.C. §119(e) to U.S. Provisional Patent Application No. 60/598,228, filed on Aug. 2, 2004. U.S. patent application Ser. Nos. 12/839,618; 11/061,355; and 60/598,228 are incorporated-by-reference into this specification.

TECHNICAL FIELD

The present disclosure is directed to corrosion resistant fluid conducting parts, methods of making such parts, and equipment including one or more such parts. The present disclosure also is directed to methods of replacing one or more fluid conducting parts of an article of equipment with improved, corrosion resistant fluid conducting parts. The present disclosure is further directed to articles from which corrosion resistant fluid conducting parts can be formed.

BACKGROUND

Various industrial processes and equipment operate at very high pressures and temperatures. For example, throughout the world the industrial scale process for synthesizing urea involves the reaction of ammonia and carbon dioxide in large high-pressure reactors at temperatures in excess of 150° C. (302° F.) and pressures of approximately 150 bar (15.0 MPa). The process is well known and is described in, for example, U.S. Pat. Nos. 4,210,600, 4,899,813, 6,010,669, and 6,412,684. In the process, ammonia, which is generally in excess, and carbon dioxide are reacted in one or more reactors, obtaining as end products an aqueous solution containing urea, ammonium carbamate not transformed into urea, and the excess ammonia used in the synthesis.

The most corrosive conditions during urea synthesis occur when the ammonium carbamate is at its highest concentration and temperature. Although these conditions occur at the most critical step in the process, only relatively few materials can withstand the conditions without experiencing significant corrosion, which can lead to equipment failure. Materials from which urea synthesis equipment has been fabricated have included in part, over time, AISI 316L stainless steel, INOX 25/22/2 Cr/Ni/Mo stainless steel, lead, titanium, Safurex® stainless steel, and zirconium.

When the urea synthesis process was first developed, "urea grade" austenite-ferrite stainless steels and other proprietary grades of stainless steel were used. The synthesis equipment includes a stripper having a vertical tube bundle in which the urea process medium is decomposed and condensed. The urea process medium flows through the inner volume of the tubes, while saturated steam circulates and condenses on the outside of the tubes. The condensing steam provides the necessary energy to decompose the excess ammonia and ammonium carbamate within the tubes into urea and water. The spacing of the tubes in the stripper is maintained by tubesheets, which include circular holes through which the tubes pass, and the individual tubes also are joined to a surface of the tubesheets by strength welds.

Few materials can withstand the internal and external conditions to which the stripper tubes are subjected without experiencing significant corrosion and/or erosion over time. The corrosion resistance of stainless steels used in stripper tubes is largely dependent on whether the urea solution in the tubes is uniformly and evenly distributed on the tube surfaces so as to passivate the stainless steel (the solution provides a portion of the passivating oxygen). If the tubes' internal surfaces are not fully and continuously wetted, the stainless steel will corrode. Thus, if the processing unit is operated at a steady-state condition and at relatively high capacity, the stainless steel tubes will perform adequately. If the unit is operated at lower capacity, however, distribution of the urea process medium in the stripper tubes may be uneven or the tubes may include unwetted internal surfaces that are not totally passivated, resulting in corrosion. Thus, currently available stainless steels were not found to be reliable stripper tube materials for use in the urea synthesis process.

To address the corrosion problems experienced with stainless steels, over 30 years ago urea synthesis equipment fabricated from titanium was developed. In this design, the titanium-clad stripper includes solid titanium tubes joined to titanium-clad tubesheets. When this design was placed in service, the vertically disposed stripper tubes were subject to corrosion and erosion in a region in the vicinity of the strength welds fusing the tubes to the stripper tubesheets. Erosion and corrosion were also noted within the first 1 meter (39.4 inches) length of the tubes. The ammonium carbamate is at the highest concentration and temperature, and decomposes and condenses in this region, and it is postulated that the erosion/corrosion occurs because of the sudden change in fluid direction, fluid impingement, or sudden evaporation in this region. After the propensity for corrosion/erosion of titanium stripper tubes was identified, the equipment was redesigned so that the stripper units could be flipped end-to-end, thereby allowing for erosion/corrosion to occur on both ends of the stripper tubes before replacement of the tubes was necessary. Although this almost doubled the service life of the stripper tubes, it was not a permanent solution to the units' corrosion problem, and many of the urea processing units fabricated with titanium stripper tubes have experienced some degree of erosion/corrosion problems.

To further address the erosion and corrosion problems experienced in urea strippers, stripper tubes fabricated using zirconium were introduced, as described in U.S. Pat. No. 4,899,813. Because zirconium is more expensive than titanium and stainless steel, early zirconium-equipped stripper tubes were designed to include a stainless steel outer tube (generally 2 mm (0.8 inch) minimum thickness) and a relatively thin tubular inner liner of zirconium (generally 0.7 mm (0.03 inch) minimum thickness) mechanically bonded (snug fit) within the stainless steel tube. The mechanical bonding necessary to retain the zirconium liner in place was achieved by expanding the inner diameter of the zirconium liner so as to snugly fit within the stainless steel outer tube. The stainless steel outer tube of the resulting snug fit dual-layer tubing provides mechanical strength and also reduced the costs of the tubing relative to solid zirconium tubing. The relatively thin zirconium liner provides improved corrosion resistance. Zirconium was selected for this application because it exhibits excellent corrosion resistance in highly corrosive, high pressure, high temperature environments.

The foregoing stainless steel/zirconium snug fit dual-layer stripper tubing was manufactured under stringent requirements to better insure a very tight mechanical fit. Nevertheless, the mechanical bonding of the layers proved to be a source of trouble in tubes intended for long service lifetimes. Because of the absence of a metallurgical bond between the corrosion resistant zirconium liner and the stainless steel outer tube, a slight gap existed between the zirconium inner liner and the stainless steel outer tube. This gap, in part, resulted from the different mechanical and physical properties of zirconium and stainless steels. For example, the materials have very different thermal expansion coefficients and, when heated, stainless steel will expand to a greater degree than zirconium. Also, because of the dissimilar properties of the materials, they cannot be fusion welded together, and it became necessary to remove a portion of the zirconium liner from the stripper tube end in order to fusion weld the tube to the stainless steel tubesheets. Regardless of how well the stainless steel tubes and zirconium liners were fabricated and how tightly the tube components were mechanically fit together, it was found that over time corrosive urea process medium was able to infiltrate the small gap between the stainless steel and the zirconium, resulting in crevice corrosion and, finally, penetration of the stainless steel outer tube. In some urea strippers having this design, the tubes began to fail for this reason, requiring shutdown of the urea synthesis equipment to repair the problem, and resulting in substantial maintenance costs.

Yet another, recent development is a design for urea synthesis stripper tube bundles including solid zirconium stripper tubes, zirconium-clad tubesheets, and an explosive bonded zirconium cladding layer on all internal wetted surfaces. However, given the cost of urea synthesis equipment, it is typically less expensive to repair corroded parts of existing equipment than to replace the equipment with this new corrosion resistant design. While parts replacement may be a cost-effective option for stripper equipment including solid zirconium stripper tubes, zirconium-clad tubesheets, and zirconium cladding on wetted surfaces, it would be advantageous if titanium clad stripper units could be manufactured with stripper tubes having improved corrosion resistance. That is because titanium-clad stripper units tend to be significantly less expensive to manufacture than zirconium-clad units.

Accordingly, it would be advantageous to provide an improved design for stripper tubes of urea synthesis equipment. It also would be advantageous to provide a method of retrofitting existing strippers for urea synthesis equipment with a form of corrosion resistant replacement stripper tubes, while utilizing the strippers' existing tubesheets.

More generally, it would be advantageous to provide an improved design for and method for producing corrosion resistant fluid conducting parts for articles of equipment operating under conditions promoting corrosion. In addition to stripper units of urea synthesis equipment, such articles of equipment include, for example, other chemical processing equipment, condenser units, and heat exchanger equipment. It also would be advantageous to provide a method of retrofitting existing worn and/or corrosion-prone parts of equipment with corrosion resistant replacement parts, wherein the replacement parts are fabricated from corrosion resistant materials such as, for example, zirconium, zirconium alloys, titanium, titanium alloys, and stainless steels.

SUMMARY

A method for making a tube comprises providing hollow first and second cylinders. The hollow first cylinder comprises zirconium, a zirconium alloy, hafnium, a hafnium alloy, vanadium, a vanadium alloy, niobium, a niobium alloy, tantalum, or a tantalum alloy. The hollow second cylinder comprises stainless steel, titanium, or a titanium alloy. The first cylinder is positioned within the second cylinder so that the outer surface of the first cylinder opposes the inner surface of the second cylinder. The end joints between the first cylinder and the second cylinder are welded together to provide a multi-layer billet. The multi-layer billet is heated to an extrusion temperature. The heated multi-layer billet is extruded to metallurgically bond the outer surface of the first cylinder to the inner surface of the second cylinder and provide a tube having a wall comprising an inner layer metallurgically bonded to an outer layer. The tube can be cold worked to reduce the wall thickness and/or diameter of the tube.

The reader will appreciate the foregoing details and advantages, as well as others, upon consideration of the following detailed description of certain non-limiting embodiments of the methods, articles and parts of the present disclosure. The reader also may comprehend such additional advantages and details upon carrying out or using the methods, articles, and parts described herein.

BRIEF DESCRIPTION OF THE DRAWINGS

The features and advantages of the methods may be better understood by reference to the accompanying drawings in which.

DETAILED DESCRIPTION

Figure 1:
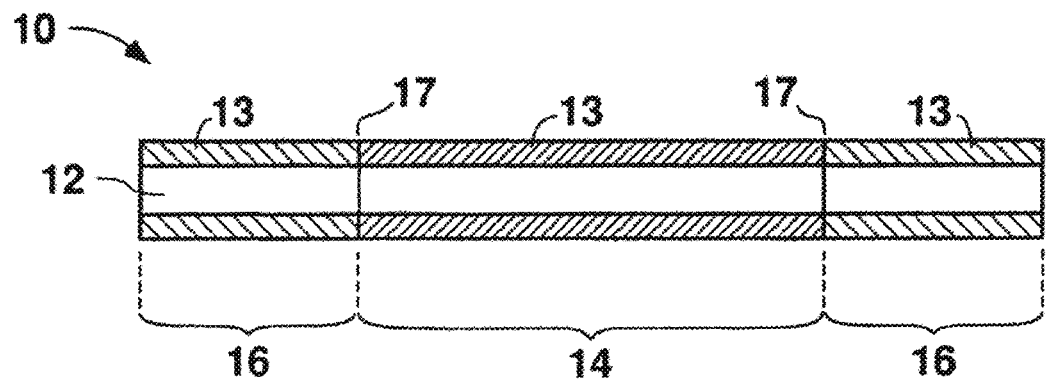
FIG. 1 illustrates one embodiment of a stripper tube according to the present disclosure, wherein the tube includes a first fluid conducting region, fabricated from zirconium, and joined by inertia welding or another solid state welding technique to a second fluid conducting region, fabricated from titanium.

Certain non-limiting embodiments provided in the present disclosure include novel corrosion resistant fluid conducting parts, equipment including one or more such parts, and methods for replacing fluid conducting parts of equipment subject to corrosive and/or erosive conditions with corrosion resistant fluid conducting replacement parts. Examples of the fluid include a gas, a liquid, or a gas/liquid mixture. Non-limiting embodiments of the novel parts include, for example, parts having cylindrical or other shapes, tubes, pipes, nozzles, stub ends, tube connectors, pipe connectors, stripper tubes, heat exchanger tubes, and other fluid conducting parts.

Certain non-limiting embodiments of the fluid conducting parts include at least one first fluid conducting region fabricated from at least one corrosion resistant material such as, for example, zirconium, titanium, tantalum, niobium, alloys of any of these metals, or another corrosion resistant metal or alloy. The parts also include at least one second fluid conducting region including a material that is compositionally identical or compositionally substantially identical to the material from which an existing mounting region of the equipment to which the part is to be mounted is formed. The corrosion resistant first region is directly or indirectly joined to the second region by solid state welding to form a unitary fluid conducting part such as, for example, a tube or a pipe. Such part may be secured to an article of equipment by welding together the identical or substantially identical materials of the second region and the mounting part of the equipment. The identical or substantially identical materials may be fusion welded, such as by, for example, autogenous welding or use of a welding filler metal, without generating conditions in the vicinity of the fusion weld that will significantly promote corrosion.

The parts and methods described in the present disclosure may be adapted for use with various types of chemical processing and other equipment. Non-limiting embodiments of such equipment and the particular fluid conducting parts of such equipment that may be constructed according to the present disclosure include tubing for urea strippers, carbamate condensers, and bi-metallic strippers, and heat exchanger tubing and pipes for chemical and petrochemical processes.

A particular non-limiting embodiment described herein is a method of replacing corroded and/or eroded titanium stripper tubes in urea synthesis equipment with replacement tubes comprising a corrosion resistant metal or alloy region, such as a zirconium or zirconium alloy region, which would be highly resistant to the corrosive/erosive effects of the urea process media within the tubes. The method allows a stripper's existing titanium-clad tubesheets and exchanger heads to be reused, so it is not necessary to replace the entire stripper unit. The method involves providing replacement stripper tubes having (i) a tubular corrosion resistant region fabricated from, for example, zirconium or a corrosion resistant zirconium alloy, and (ii) at least one tubular mounting region fabricated from, for example, titanium or another metal or alloy that may be fusion welded to the titanium-clad tubesheet of the stripper without generating conditions in the vicinity of the fusion weld that significantly promote corrosion or erosion. The corrosion resistant region and the mounting region are joined either directly or indirectly by a solid state welding technique to form the fluid conducting replacement part.

Figure 2:
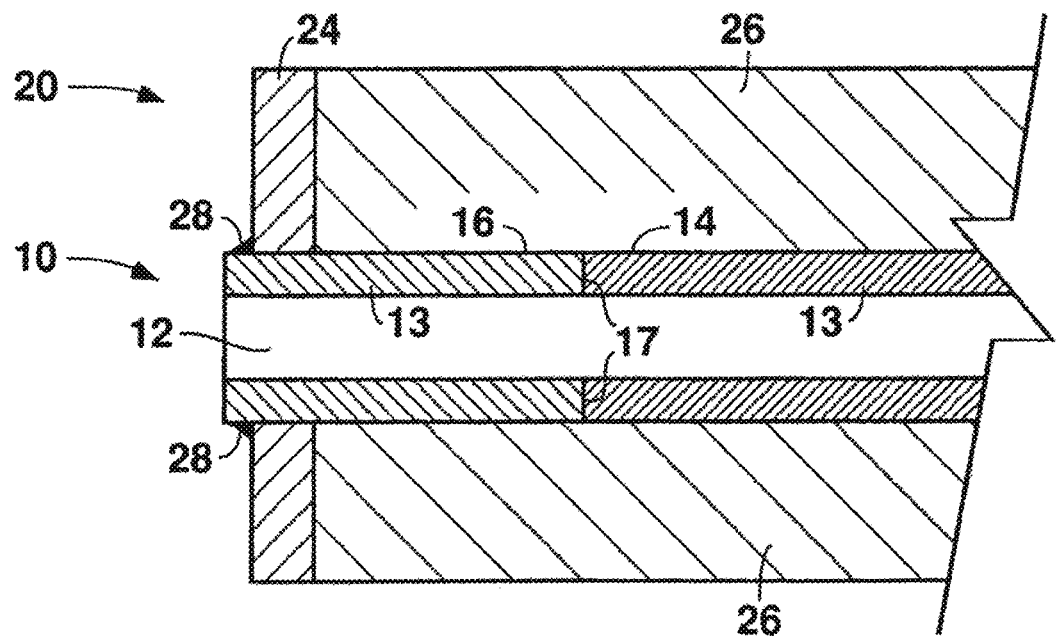
FIG. 2 illustrates an arrangement for mounting the stripper tube of FIG. 1 to a titanium-clad surface of a stripper tubesheet and which includes the use of a multi-layer fluid conducting tube end.

FIG. 1 is a sectioned view of one non-limiting embodiment of a stripper tube 10 constructed according to the present disclosure. The tube 10, for example, may be provided as an original part of a stripper unit or, as discussed above, may be used as a replacement stripper tube to retrofit an existing stripper unit. The stripper tube 10 includes a cylindrical passage 12 defined by continuous wall 13. A central portion of the continuous wall 13 of tube 10 is a corrosion resistant zirconium tube 14. A length of titanium tubing 16 is inertia welded on each end of the zirconium tube 14. The titanium tube ends 16 may be fusion welded to an existing titanium-clad tubesheet in the stripper unit without producing a dissimilar zirconium-to-titanium fusion weld. FIG. 2 shows one possible arrangement for a tube-to-tubesheet weld to secure stripper tube 10 through a tube hole in a tubesheet 20. It will be understood that the mounting configuration shown in FIG. 2 may be used when initially manufacturing a stripper, or may be used when replacing stripper tubes in an existing stripper that is in service. Tube 10, which includes titanium tube end 16 inertia welded at region 17 to zirconium tube region 14, is disposed through a bore in the titanium cladder sheet 24 of the tubesheet 20. Regions 26 are carbon steel or stainless steel regions of the tubesheet 20. Tube 10 is secured to tubesheet 20 by a titanium strength weld 28 at a junction of the titanium tube end 16 and the titanium cladder sheet 24. Thus, the fusion weld region is entirely of titanium, and no alloys combining titanium and zirconium are generated in the fusion weld region.

As discussed below, it is believed that alloys formed in the weld region when fusion welding dissimilar metals, such as the zirconium-titanium alloys formed when fusion welding together zirconium and titanium, have a propensity to corrode when subjected to corrosive substances and/or conditions. Solid state welding, however, does not generate alloys in any significant amounts. Accordingly, by providing fluid conducting parts having a highly corrosion resistant region solid state welded to a region including material that is compositionally identical or compositionally substantially identical to a mounting part of the equipment, or that otherwise does not produce alloys prone to corrosion when fusion welded to the mounting part, the present method allows equipment to be manufactured or retrofitted with corrosion resistant parts without creating conditions promoting corrosion.

As used herein, solid state welding refers to a group of welding processes that produce coalescence at temperatures essentially below the melting point of the base materials being joined, without the addition of brazing filler metal. Pressure may or may not be used during various solid state welding processes. Non-limiting examples of solid state welding techniques that may be used in embodiments of the methods disclosed herein include, for example, cold welding, diffusion welding, explosion welding, forge welding, friction welding (including inertia welding), hot pressure welding, roll welding, and ultrasonic welding. These techniques have been used for many years in other applications and are well known to those having ordinary skill. As such, an extended discussion of such joining techniques need not be presented herein to allow those of ordinary skill to practice the present methods.

Solid state welding fundamentally differs from fusion welding, wherein the materials to be joined are melted during the joining process. In the case where the fusion welded materials are not identical, the fusion weld region necessarily includes alloys of the joined materials. Fusion welding zirconium directly to titanium, for example, would create alloys that enhance corrosion/erosion rates in the vicinity of the weld region. Fusion welding of zirconium and titanium also will cause solid solution hardening in the resultant weld, which, in turn, reduces weld ductility and significantly increases weld hardness. The resultant alloy mix across the zirconium to titanium weld joint includes a range of zirconium-titanium alloy mixtures (of 100% titanium to 100% zirconium, and all combinations in between). The alloy compositions found in a dissimilar zirconium to titanium weld will have different mechanical properties and corrosion properties, which are impossible to accurately control during the welding process. Mechanically, the alloys of zirconium and titanium are very high strength and can have very high hardness, which can be up to twice as hard as either of the pure metals alone. Other mechanical properties that may be affected by fusion welding are notch sensitivity and formability. Thus, certain regions of a zirconium/titanium fusion weld may exhibit mechanical properties that are not acceptable if substantial pressures are generated within the equipment. Certain alloy compositions (regions of the weld mixture) will experience very high oxidation and corrosion rates.

Generally, the resultant corrosion resistance of a metal welded to a dissimilar metal will have a much lower corrosion resistance than that of either pure metal alone, and that is the case in the fusion welding of zirconium and titanium. Even if a pure zirconium or titanium filler metal is used, there will be an area in the weld in which a zirconium-titanium alloy exists having low corrosion resistance relative to either pure metal alone. A Huey corrosion test is a standard corrosion screening test for materials used in applications in which the materials contact nitric acid and/or urea. It has been determined that in a Huey corrosion test, for example, a zirconium-titanium fusion weld will exhibit a high rate of corrosion, while a titanium-titanium or zirconium-zirconium weld will exhibit a very low corrosion rate.

Thus, by solid state welding the zirconium and titanium fluid conducting regions together and fusion welding one or more of the titanium tube regions to the titanium cladding of the tubesheet, the foregoing non-limiting embodiment described herein avoids fusion welding of dissimilar materials. This, in turn, avoids producing alloys within weld regions having relatively high corrosion/erosion rates when exposed to the urea process media and other corrosion promoting conditions within the stripper of urea synthesis equipment. A significant enhancement in service life of the newly manufactured or retrofitted stripper should result.

Given its reproducibility and ready adaptation to fuse tubular and cylindrical members, inertia welding may be readily applied to form embodiments of the novel parts described herein. As is known in the art, inertia welding is a solid state welding technique that is a type of friction welding wherein the materials to be joined are forged together without melting the materials. In inertia welding the energy required to make the weld is supplied primarily by the stored rotational kinetic energy of the welding machine. One of the two workpieces is held on a rotatable spindle attached to a flywheel of a specific mass. The other workpiece is held in a chucking device and is restrained from rotating. The flywheel is accelerated to a predetermined rotational speed and then disengaged, so that the rotating components are free to rotate with a specific kinetic energy. At the time the flywheel drive motor is turned off, the workpieces are forced together with an axially applied pressure, which in some techniques may be increased during the weld cycle. The kinetic energy stored in the rotating flywheel is dissipated as heat through friction between the workpieces at the weld interface, and this large localized energy bonds the workpieces. The axial pressure is maintained until all of the energy in the rotating mass has been dissipated in the weld, thereby stopping the rotation. During the weld cycle, material that is in the interface becomes plastic as a result of the dissipated frictional heat, and is forged out of the weld. The remaining plasticized material is hot worked together to accomplish the weld. The resulting loss in length of the workpieces as force is applied and plasticized material is forced out of the contact area is referred to as an "upset". In inertia welding tubular elements to form a length of tubing, both the inner and outer diameter of the resulting tube will have flash resulting from the upset. The flash may be removed using finishing techniques. Because the materials joined by inertia welding do not melt during the process, no significant alloying occurs, thereby avoiding the adverse affects alloy formation has on mechanical and corrosion properties in the weld zone.

Inertia welding may be used to join metal combinations not normally considered compatible, such as, for example, aluminum to steel, copper to aluminum, titanium to copper, and nickel alloys to steel. In general, any metallic materials that are forgeable can be friction welded, such as by inertia welding, including maraging steel, tool steel, alloy steels and tantalum. The inertia welding process is generally much faster than fusion welding, and the process is principally controlled by the machine, thereby eliminating human error so that the resultant weld is independent of operator skill. There also is no need for significant weld joint preparation, and no weld wire or welding consumable is required.

Explosion welding is a well known solid state welding technique for joining dissimilar materials, and the technique is generally described throughout the literature. Examples of such descriptions include "Explosion Welding", Volume 6, ASM Handbook, *Welding, Brazing and Soldering* (ASM Intern. 1993), pages 705-718; and A. Nobili, et al., "Recent Developments in Characterizations of Titanium-Steel Explosion Bond Interface", 1999 Reactive Metals in Corrosive Applications Conference Proceedings, Sep. 12-16, 1999 (Sunriver, Oreg.) pages 89-98. In explosion welding, the controlled energy of a detonating explosive is used to create a metallurgical bond between two or more similar or dissimilar metallic materials. During the high-velocity collision of the materials, under proper conditions a jet is formed between the materials, which sweeps away contaminant surface films. The materials, cleaned of surface films by the jet action, are joined at an internal point under the influence of the very high pressure that is obtained near the collision point. Diffusion of the materials does not occur during explosion welding, so problematic alloys are not generated.

As used herein, "metallurgical bond" refers to a bond between mated metallic surfaces achieved through application of pressure and/or temperature.

In the forgoing embodiment for manufacturing urea synthesis stripper tubes, for example, an explosive cladded weld joint could be formed between the titanium and zirconium segments of the replacement stripper tube. In one embodiment of such a process, for example, zirconium and titanium would be explosively bonded together and a small tube would be machined from the plate. The tube would be composed of a zirconium side and a titanium side. The zirconium would then be fusion welded to the zirconium tube portion, and the titanium would be fusion welded to the titanium tube portion. Explosive cladded tube transition joints are currently produced, although the inventor is not aware of such tubes having a zirconium-to-titanium metal combination.

Although the foregoing specific embodiments are directed to the use of stripper tubes within a urea synthesis unit, wherein the stripper tubes include a zirconium region and one or more titanium regions, it will be understood that the parts and methods described herein are not so limited. For example, methods according to the present disclosure may be adapted for providing original or replacement fluid conducting parts for other types of chemical processing equipment, as well as other types of equipment, wherein one or more fluid conducting parts comprise a fluid conducting first region including a corrosion resistant material directly or indirectly joined to a fluid conducting second region by a solid state welding technique so that a fluid conducting passage in the first region is positioned in fluid communication with a fluid conducting region of the second region. The resulting weld region does not suffer from significantly reduced mechanical and/or corrosion properties relative to the first and second materials. A material within the second region may be selected so that it may be secured by fusion welding to a region of the chemical processing or other equipment that is fabricated from a compatible material. By "compatible", it is meant that the fusion welding process does not produce alloys in the weld region having significantly degraded mechanical and corrosion properties. One example is an original or replacement tube for a heat exchanger, wherein the tube is fabricated of a corrosion resistant region and a second region as just described.

Moreover, although the above non-limiting specific embodiments include solid state welded fluid conducting parts that have separate regions including zirconium and titanium, the present method also may be applied in cases in which the corrosion resistant first region includes one or more zirconium alloys or other corrosion resistant materials and/or where the second region includes titanium alloys or other materials. Non-limiting examples of possible zirconium alloys include, for example, Zr700 (UNS R60700), Zr702 (UNS R60702), Zr705 (UNS R60705), and Zircaloys (including, for example, Zr-4, Zr-2, and Zr2.5Nb). As a non-limiting example, it is contemplated that parts constructed according to the present disclosure may be used in equipment wherein the existing structure to which the fluid conducting part is fused is a titanium alloy or a stainless steel, in which case the corresponding region of the part may be fabricated from a like or substantially like titanium alloy or stainless steel, respectively. In constructing such a part, a region including the titanium alloy or stainless steel is either directly or indirectly solid state welded to another region of zirconium, zirconium alloy, and/or another metal or alloy providing desired mechanical, corrosion and/or other properties.

Another possible modification of the above embodiment of the method of the present disclosure is to provide a multi-layer fluid conducting end or region including a corrosion resistant inner layer surrounding a fluid passageway and an outer layer of another material. As used herein, "multi-layer" refers to the presence of two or more layers of differing materials metallurgically bonded in the referenced structure. The corrosion resistant material of the inner layer may be, for example, zirconium, a zirconium alloy, or another corrosion resistant metal or alloy. The multi-layer end or region may be formed by any suitable method, such as, for example, by co-extrusion, also known as extrusion bonding, of the layers. Co-extrusion is a method of forming tubing that is readily familiar to those having ordinary skill, and which also is discussed further herein. The multi-layer fluid conducting end or region may be solid state welded, such as by inertia welding, to a corrosion resistant fluid conducting region formed from zirconium or another corrosion resistant material so that fluid conducting passages through the regions are in fluid communication. In this way, a highly corrosion resistant metal or alloy is provided along the entire inner length of the fluid conducting part. If the outer layer of the multi-layer end or region is formed of titanium, for example, it may be fusion welded to the titanium cladding of a stripper unit tubesheet without significantly compromising the mechanical and corrosion properties of the material in the vicinity of the weld.

Multi-layer tubing designs are known for nuclear cladding to contain fuel pellets. The patent literature includes known methods of metallurgically bonding layers of zirconium-based alloys for this particular application. For example, a thin pure zirconium internal liner for a nuclear cladding tube is described in U.S. Pat. No. 4,200,492. The zirconium liner inhibits crack initiation and propagation from stress corrosion cracking. A much thicker outer layer of alloyed zirconium constitutes the cladding's base material and provides suitable corrosion resistance and mechanical properties. Additional patents such as, for example, U.S. Pat. Nos. 5,383,228, 5,524,032 and 5,517,540, describe variations of chemistry, layer stack-up, and processing options for multi-layer nuclear fuel pellet cladding. In one arrangement, a thin external liner has been utilized for fuel pellet cladding to improve water-side corrosion resistance of the cladding. The present inventors conceived of adapting certain aspects of multi-layer nuclear fuel cladding to embodiments of the fluid-conducting parts of the present disclosure comprising multi-layer fluid conducting part arrangements. In contrast to certain embodiments of the present fluid-conducting parts, however, the foregoing patents are directed to nuclear fuel cladding and to bonding layers of similar zirconium-based alloys, and, for example, do not teach or suggest metallurgically bonding dissimilar reactive metals, such as titanium and zirconium.

As noted herein, dissimilar reactive metals such as titanium and zirconium alloys are difficult to join due to, for example, differences in their thermal expansion properties, crystal lattice size differences, and deficiencies in weld integrity when the materials are bonded. Explosion welding has been used to metallurgically bond dissimilar alloys, but this technique suffers from known shortcomings. For example, localized deformation or thinning of the bonded layers can occur due to variation in the explosive force. As such, post-bonding machining has been used, but it can be difficult to accurately control inner liner thickness during machining. Also, the pressure forces generated during explosion welding cause the metal to behave like a viscous fluid, which can lead to a wavy borderline between the bonded materials. The wavy character of the borderline makes difficult or impossible maintaining precise liner thickness since the extent of the borderline can vary significantly. In certain known explosive bonded designs, for example, the wavy borderline between the bonded materials varies from 0.5 mm to 1 mm (0.0197 inch to 0.0394 inch) peak-to-peak. The geometry of parts to be bonded also is a limiting constraint when using explosion welding. In certain explosion welding techniques, an outer component is surrounded by explosive to implode onto an inner liner of a dissimilar material that has been supported with a rod to prevent collapse inward beyond a point. In such technique the wall thickness and strength of the outer components are a limiting factor. In an alternative technique, explosive is placed within the inner diameter of a liner component, and the explosive force expands the inner liner onto the inner surface of an outer component. In such case, the inner diameter must be large enough to contain sufficient explosive, which may preclude using the technique in manufacturing small internal diameter, thick-walled tubes and other fluid conducting parts, such as are used in high-pressure heat exchangers.

Several alternate methods are known for metallurgically bonding dissimilar metals and alloys. For example, U.S. Pat. No. 4,518,111 provides a two-step method for bonding zirconium and steel components. In an initial step, explosion welding is used to metallurgically bond the two components into a billet. In a second step, a steel third layer is metallurgically bonded by co-extruding the billet, thus providing three bonded layers. Of course, use of explosion welding has the limitations discussed above, and the use of a two-step process of bonding the layers increases costs of the final product. U.S. Pat. No. 5,259,547 also describes a two-step process including a step of explosion welding, followed by expanding the bonded billet over a profiled mandrel to securely metallurgically bond the layers. Although multi-layer fluid conducting parts within the present invention may be produced using multiple-step manufacturing methods, there may be a significant cost advantage associated with one-step bonding methods, such as those described in detail herein.

Another known approach to metallurgically bonding dissimilar metals or alloys is the use of hot isostatic pressing (HIP) to pre-bond cylindrical components before solid state bonding by extrusion. U.S. Pat. No. 6,691,397 utilizes HIPing with pressure in excess of 15,000 psig and temperature over 2000° F. for at least 2 hours up to 24 hours. HIPing produces a metallurgical bond between the dissimilar metals, allowing materials of different flow stresses to maintain integrity during hot extrusion into tube. Of course, as discussed above, a two-step bonding process may add costs relative to a single-step process. Also, initially forming a metallurgical bond between the materials by HIPing requires significant time under pressure and at temperature. Dissimilar materials can form a brittle interdiffusion layer at their interface, or can experience excessive grain growth during heating for extended periods. Neither attribute is desirable if the extruded tube subsequently is to be cold worked.

Yet another approach to forming a metallurgical bond between dissimilar metals or alloys is described in U.S. Pat. No. 5,558,150, in which an outer alloy layer is centrifugally cast onto an inner layer. The layers of the composite casting are metallurgically bonded upon cooling. The process of this patent is designed for bonding steels and reactive metal, which requires that casting be conducted in a vacuum to preclude oxygen and nitrogen contamination from the atmosphere. In addition, the grain structure of cast materials is unrefined, preventing subsequent cold working.

One non-limiting embodiment of a method by which cylindrical zirconium/titanium multi-layer fluid-conducting parts or part portions useful in the present disclosure includes the steps generally shown in FIG. 3, as further described below.

Figure 3:
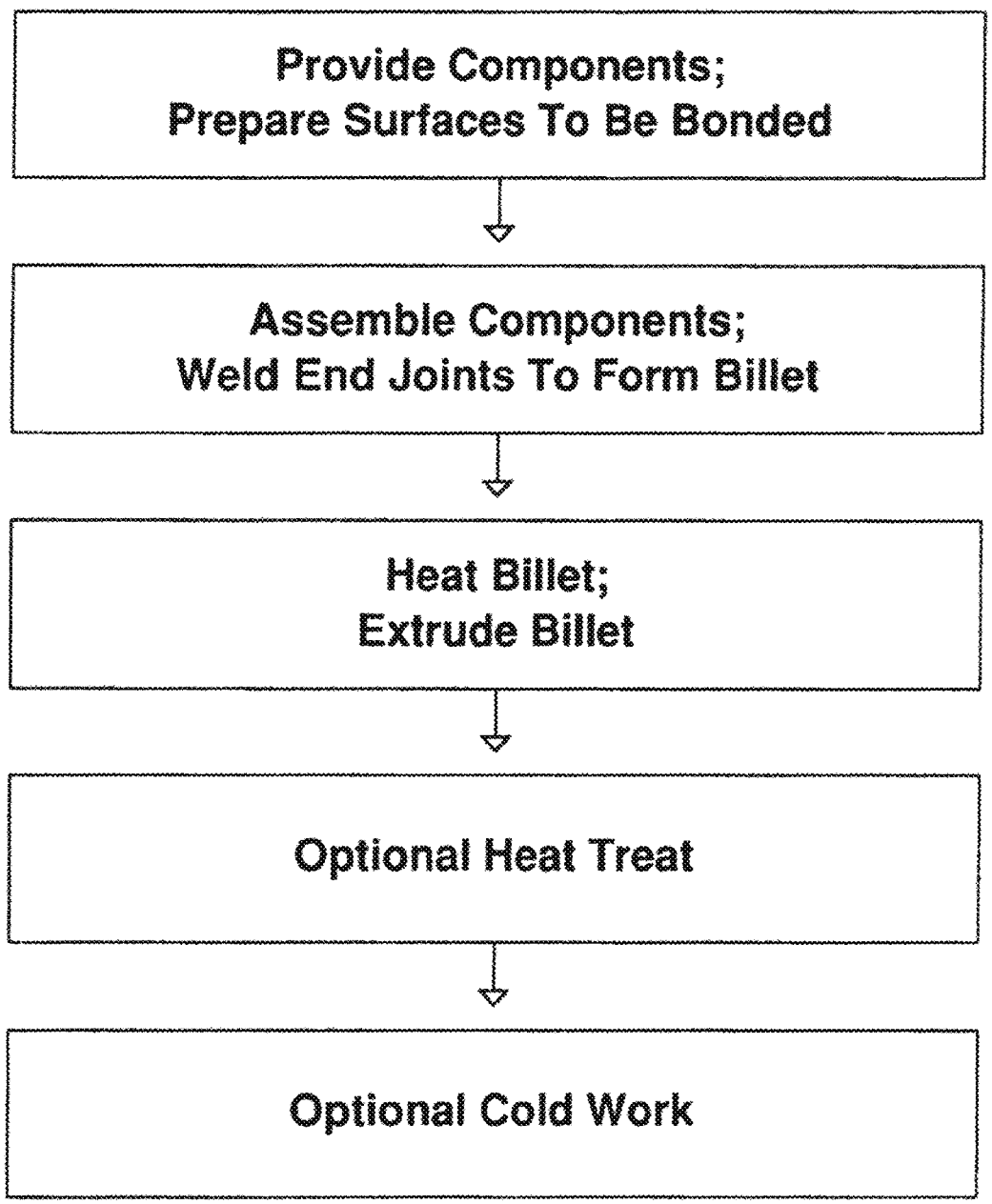
FIG. 3 schematically illustrates an embodiment of a process for fabricating a multi-layer fluid conducting part according to the present disclosure.

In a first step of the method of FIG. 3, individual hollow cylindrical titanium and zirconium components to be bonded together are provided in suitable forms, with the cylindrical zirconium liner component sized to fit within the inner diameter of the cylindrical titanium base component. As an example, the base part may be Titanium Grade 3 (ASTM designation) and the zirconium liner part may be Zircadyne 702™ (Zr702) alloy. The surfaces of the parts to be bonded together are suitably prepared to better ensure a satisfactory metallurgical bond between the components. It is advantageous to machine, surface condition, and clean the surfaces to be bonded together. For example, the inventors have determined that when preparing titanium and zirconium prior to metallurgically bonding, it is advantageous to prepare the surfaces to be bonded so that each has surface roughness no greater than about 63 micro-inches (0.0016 mm) RA. It is believed that providing surfaces with such a surface finish better ensures adequate cleaning in the peaks and valleys of the surface roughness profile. Also, it is believed that an absence of deep grooves and scratches, for example, helps maintain a continuous metallurgical bond between the surfaces without delaminations.

It is also advantageous to clean the surfaces to be bonded of foreign contaminants such as, for example, dirt and oil so that a high-quality metallurgical bond results. An example of one method that may be used to clean surfaces of reactive metals is ice blasting, which is described in U.S. Pat. No. 5,483,563. The ice blasting technique involves propelling crystalline water against the metal or alloy surface to be cleaned, resulting in both mechanical scrubbing and liquid flushing. Ice blasting can result in an improved integrity of the metallurgical bond between surfaces relative to conventional surface cleaning methods since ice blasting does not deposit a cleaning agent residue on the cleaned surfaces. An example of such a residue is residual fluoride that may be left behind on a surface etched with hydrofluoric-nitric acid. Non-limiting examples of alternative surface cleaning techniques include mechanical conditioning, acid etching, and use of solvent or alkaline cleaners. Those of ordinary skill will know of other suitable surface cleaning techniques.

Figure 4:
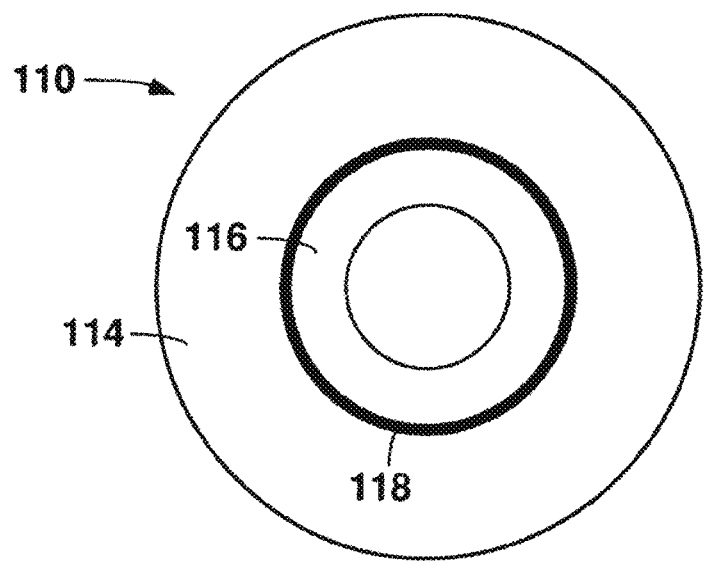
FIG. 4 schematically illustrates an end of a welded bi-layer billet made as an intermediate article in the process of FIG. 3.

In a second step of the method in FIG. 3, the components are assembled so that the zirconium liner component is suitably seated within the titanium base component, and the end joints between the components are welded so as to provide a multi-layer billet suitable for extrusion. A schematic end view of the multi-layer billet 110 is shown in FIG. 4, wherein 114 is the cylindrical titanium outer base material, 116 is the cylindrical zirconium inner liner, and 118 is the welded end joint between the base material and the liner. The weld may be, for example, an autogenous fusion weld, in which case the weld comprises a titanium-zirconium mixture. As previously described, the fusion welding of dissimilar reactive metals produces an alloy in the weld zone that typically has lower strength and ductility relative to the individual metals. The integrity of the welds joining the end joints of the billet, however, is critical to prevent the atmosphere from contaminating the interfaces of the components during preheating of the billet prior to extrusion of the billet in a succeeding step. In addition, the welds are subjected to very large stresses during extrusion. Weld failure during extrusion can result in atmospheric contamination or non-uniform reduction of the base and liner components during extrusion.

In one embodiment of the method of FIG. 3, an alternative technique, electron beam welding, is used to weld the end joints between the base and liner components to provide the billet. Electron beam welding has been found to provide acceptable weld penetration and weld width, and to provide adequate protection from atmospheric contamination between the interfaces. Preferably, the weld penetrates the end joint from 5 to 50 mm (0.197 to 1.97 inch) (measured in the planes of the welded surfaces) and with a width adequate to seal the opposed surfaces of the base and liner components from the atmosphere. Suitable alternative techniques of providing autogenous or filler welds will be known to those having ordinary skill in the art of welding reactive metals.

In a third step of the method illustrated in FIG. 3, the billet formed in the prior step is heated and extruded to form a metallurgically bonded, seamless tube of dissimilar metals having a substantially uniform liner thickness. In one embodiment of the method, the titanium/zirconium billet is induction heated to a temperature in the range of 550° C. to 900° C. (1022° F. to 1652° F.). Alternatively, for example, a gas or electric furnace may be used to heat the billet prior to extrusion, but such heating techniques take significantly more time and create more surface contamination on the billet relative to induction heating.

The heated billet is loaded into an extrusion press with suitable tooling to produce a concentric tube from the billet. In one embodiment of the method, the extrusion ram is advanced at a substantially consistent 50 to 900 mm/minute (1.969 to 35.4 inches/minute) during the extrusion cycle to avoid unacceptable fluctuations in the liner thickness of the extruded tube. Factors influencing the quality of the metallurgical bond resulting from extrusion include temperature, time at temperature, pressure, and surface cleanliness. In the present non-limiting embodiment, for example, the extrusion ratio may range from 3:1 to 30:1 to better ensure adequate pressure to metallurgically bond the base and liner components.

A significant advantage of induction heating the billet and then extruding the billet to metallurgically bond the layers is that the time period during which the billet is heated to and held at the extrusion temperature can be very limited. When the time at extrusion temperature is small, little or no interdiffusion occurs between the titanium and zirconium layers when the metallurgical bond is formed during the extrusion. An interdiffusion, or simply "diffusion", layer typically exists between layers of dissimilar metals that have been metallurgically bonded. The diffusion layer may include intermetallic compounds or compositional gradients that are harder or more brittle than the individual alloys. Because there is a lack of significant interdiffusion when rapidly induction heating the billet and then extruding the billet to metallurgically bond the layers, material that is brittle and has high strength relative to the zirconium and titanium layers is not formed in significant amounts. This allows the extruded, multi-layer part to be readily cold worked, such as by, for example, cold drawing or cold tube reducing, if necessary to fabricate the final fluid conducting part. Accordingly, one significant aspect of certain embodiments of the methods described herein is to produce a part including dissimilar, metallurgically bonded layers without the formation of any substantial interdiffusion layer between the bonded layers. It can be determined that no substantial interdiffusion layer has formed during thermal exposure from extrusion, annealing, or alternative metallurgical bonding processes if the resulting metallurgically bonded multi-layer structure can be readily cold worked, such as by cold drawing or cold tube reducing.

In an optional fourth step of the method illustrated in FIG. 3, the extruded multi-layer tubing is heat-treated to relieve stresses within the material and/or recrystallize the material before application of cold work. Preferably, the heat treatment technique minimizes the development of an interdiffusion layer between the reactive metallurgically bonded layers. To better inhibit interdiffusion layer development, the heat treatment preferably is tailored to achieve desired stress relief and/or recrystallization in the constituent materials of the multi-layer tubing using the minimum necessary temperature and time. As an example, titanium/zirconium multi-layer tubing made by the present embodiment may be annealed at a temperature in the range of 500° C. to 750° C. (932° C. to 1382° C.) for 1 to 12 hours to limit the development of the interdiffusion layer. Those of ordinary skill in the heat treatment arts may readily fashion a suitable heat treatment regimen for a particular multi-layer fluid conducting part made according to the present disclosure.

In a fifth step of the method of FIG. 3, the multi-layer tubing is cold worked. Cold working reactive metals can provide beneficial attributes such as improved grain structure, mechanical properties, dimensions, and surface finish. As noted above, a method of fabricating the tubing that limits the generation of a brittle interdiffusion layer is preferred. Possible cold working techniques useful for multi-layer tubing made according to the present disclosure include, for example, cold drawing, cold tube reducing, and tube rolling with internal and external rolls, such as by flow forming. Other techniques of suitably cold working a multi-layer fluid conducting member made according to the present disclosure will be apparent to those of skill in the art upon considering the present disclosure.

Cold tube reducing (also known as "pilgering") has been found to be a particularly advantageous cold working technique in connection with the present embodiment of the method of the present disclosure. Cold tube reducing employs grooved, tapered dies that roll lengthwise over the tube while pressing the material onto a tapered mandrel. The gradually decreasing cross-sectional area of the grooves compresses the tube walls onto the corresponding tapered mandrel. The tube is fed longitudinally into the dies and is rotated about its longitudinal axis so that the entire circumference is uniformly reduced in dimension. Typical reductions achieved when cold tube reducing tubular members of reactive metals are in the range of 20% to 90%.

It will be understood that although the embodiment of the method illustrated in FIG. 3 and described above utilizes a titanium base component and a zirconium liner, alternative materials may be used for the base and liner components. For example, and without intending to limit the scope of the invention in any way, one may employ a titanium or titanium alloy outer base and a niobium or niobium alloy inner liner, or a tantalum or tantalum alloy external liner and a titanium or titanium alloy inner base. Other materials combinations may be selected based on the application for which the tubing is adapted, and such combinations will be apparent to those of ordinary skill upon consideration of the present disclosure.

It also will be understood that multi-layer fluid conducting parts or part portions made according to the present disclosure need not be made using the method outlined in FIG. 3. For example, alternative methods are disclosed herein. Also, those having ordinary skill, upon reading the present disclosure, may readily design alternate methods for providing such multi-layer parts or part portions.

Moreover, although the present description generally refers to multi-layer parts and part portions having two layers, more than two layers may be provided in such parts or part portions. For example, the part may include three or more layers, as desired, which may be assembled into a billet and processed to a fluid conducting part as generally described above with respect to a dual layer part. As such, it will be understood that the scope of the present invention includes fluid conducting parts including three or more layers, including a corrosion resistant inner layer or liner surrounding a fluid conducting passage through the part, an outer layer, and one or more intermediate layers intermediate the inner and outer layers. In such case, the inner and outer layers are referred to herein as being "indirectly" bonded, which contrasts with the case wherein the inner and outer layers are "directly" bonded to one another. In each case, however, the immediately adjacent layers in the multi-layer structure are metallurgically bonded together. As noted, such multi-layer fluid conducting parts and part portions may be made using the teachings herein along with the knowledge of those persons having ordinary skill.

Figure 5:
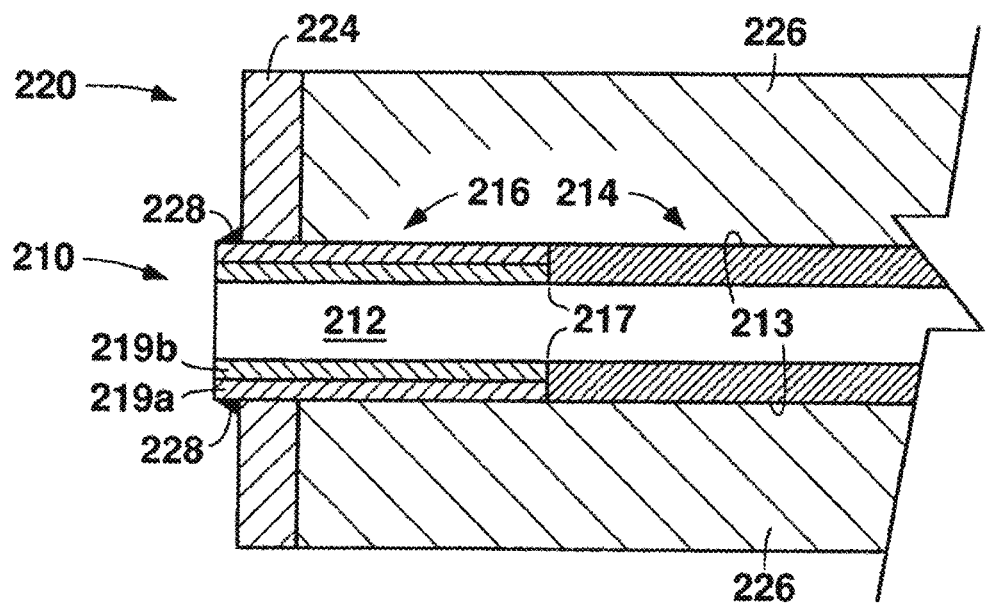
FIG. 5 illustrates an arrangement for mounting an embodiment of stripper tube including a multi-layer tube end according to the present disclosure to a titanium-clad surface of a stripper tubesheet.

One arrangement for securing an original or replacement zirconium/titanium stripper tube having a mono-layer tube section solid state welded to a multi-layer tube end to a tubesheet is shown in cross section in FIG. 5. The bi-layer tube end shown in FIG. 5 may be fabricated, for example, by co-extrusion to provide an outer layer of titanium and a corrosion resistant zirconium inner liner. With reference to FIG. 5, stripper tube 210 includes a central cylindrical passage 212 defined by tubular wall 213. A tubular zirconium region 214 is solid state welded to a bi-layer tubular end region 216 at weld region 217. Bi-layer end region 216 includes tubular titanium outer region 219a metallurgically bonded to tubular zirconium inner liner 219b. Tubesheet 220 includes titanium cladder sheet 224 bonded to carbon or stainless steel region 226. Titanium strength weld 228 is formed by fusion welding titanium outer region 219a to titanium cladder sheet 224. It will be understood that because like materials are fusion welded to secure stripper tube 210 to tubesheet 220, problematic alloys having reduced corrosion resistance are not produced, and the mechanical properties of the materials in the vicinity of the weld zone are not significantly compromised.

In a modification to what is described above, the tubes may include a corrosion resistant tubular region of zirconium, zirconium alloy, or another corrosion resistant material, and a tubular region including stainless steel, and the two regions are directly or indirectly joined by inertia welding or another solid state welding technique to form a unitary tube. Stripper tubes made in this way may be used as original equipment in newly manufactured strippers including stainless steel tubesheets, or may be used as replacement tubes to retrofit strippers including stainless steel tubesheets. The stainless steel of the stripper tubes is selected to be compositionally substantially identical to the tubesheet stainless steel to which the tubes are fused. A strength weld is formed at the junction of the tube stainless steel and the tubesheet stainless steel to secure the tubes to the stripper unit. Of course, any of the possible materials combinations and designs described herein for stripper tubes also will be useful as original or replacement stripper tubes in particular stripper designs.

Yet another possible modification to the parts and methods described herein is to include one or more materials intermediate regions of the part that are joined by solid state welding. As noted, regions joined with such intermediate materials are referred to herein as having been "indirectly" joined by solid state welding. In the case of solid state welding a first region of zirconium or a zirconium alloy to a second region of titanium or a titanium alloy, for example, possible materials disposed intermediate the first and second regions may include, for example, one or more of low oxygen titanium, vanadium, tantalum, hafnium, niobium, and alloys of these materials. These intermediate materials would be problematic if fusion welding were used, but may be suitably joined to the other materials by inertia welding.

The following examples further illustrate characteristics of embodiments of the parts and methods described herein.

Example 1—Comparative Study of Solid State and Fusion Weld Joints

In connection with the methods disclosed herein, the mechanical and corrosion characteristics of zirconium-to-titanium fusion weld joints were evaluated relative to weld joints produced by solid state welding. It is well known that zirconium and titanium can be fusion welded using techniques such as, for example, gas tungsten arc welding, metal gas arc welding, plasma welding, and resistance welding, to produce a high strength weld joint. As noted above, however, the weld produced on joining dissimilar materials by fusion welding can be affected by corrosion and is subject to solid solution hardening that can significantly increase the hardness and strength of the weld zone. In autogenous (that is, without the use of filler metal) fusion welding of zirconium to titanium, the zirconium-titanium alloys produced in the weld zone will vary from 100% zirconium to 100% titanium. This alloying effect can be somewhat lessened through the use of either zirconium or titanium filler metal. Even with the use of filler metal, a region of the weld will be composed of various zirconium-titanium alloy compositions, and such alloy region may have significantly compromised corrosion resistance and mechanical properties. The solid state welding of tubular sections was investigated as a means to avoid melting of the joined material during welding and creation of problematic alloys in the weld zone.

Experimental Procedure

Figure 6:
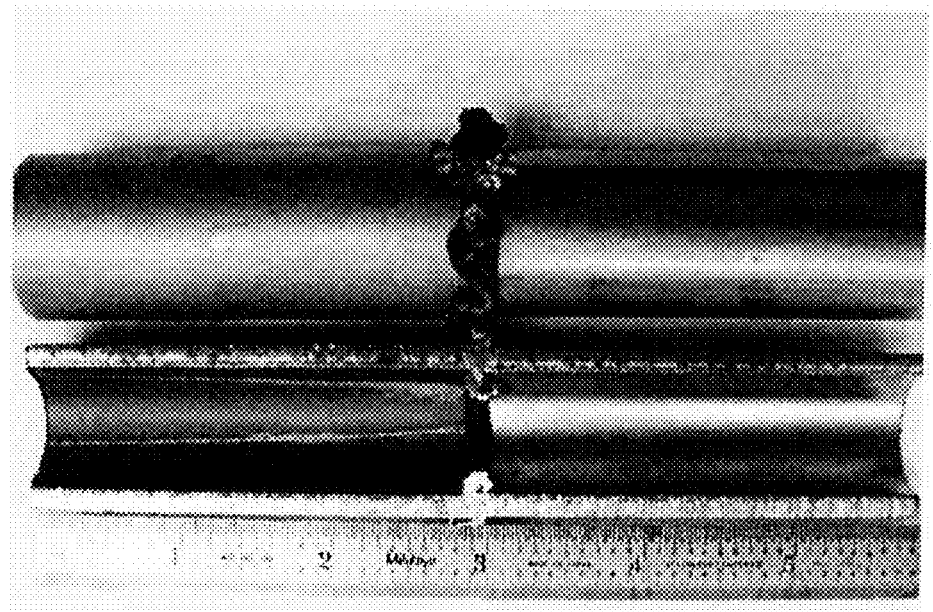
FIG. 6 depicts unsectioned and sectioned samples of a zirconium tube section that has been inertia welded to a titanium tube section according to an aspect of the present disclosure.
Figure 7:
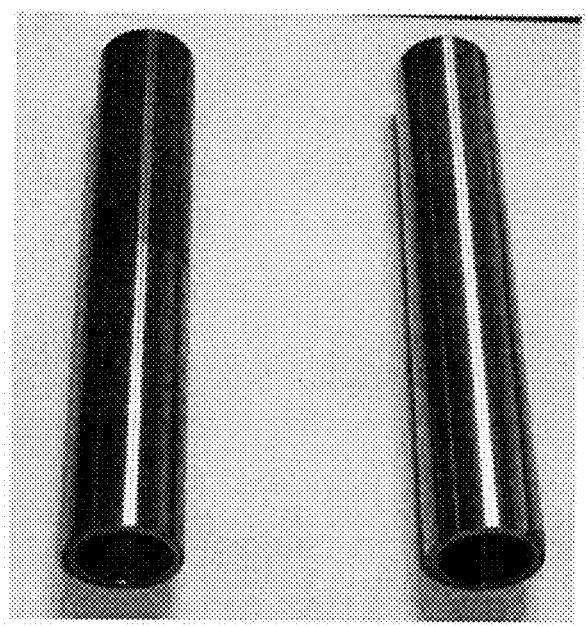
FIG. 7 depicts two samples of a zirconium tube section inertia welded to a titanium tube section according to an aspect of the present disclosure, and wherein the resultant zirconium/titanium fluid conducting tube has been machined to remove flash.

Several weld samples were prepared by inertia welding a zirconium tube section to a titanium tube section to create a unitary tube. FIG. 6 depicts both an unsectioned inertia weld sample and a sectioned inertia weld sample, wherein a zirconium tube section (darker colored material) has been inertia welded to a titanium tube section, creating flash on the inner diameter and outer diameter. The flash was forced from the weld area through upset occurring during the weld cycle. Because the welding process may cause thermal stresses in the final weld joint, certain of the inertia welded samples were stress relieved at an aim of 550° C. (1022° F.) for about ½ hour to remove weld stresses. In welded samples where a stress relief heat treatment was used, the samples were evaluated both before and after the heat treatment. FIG. 7 shows two fully machined inertia weld samples wherein the flash has been removed.

For purposes of comparison, several samples of a zirconium plate section fusion welded to a titanium plate section were prepared and evaluated. Both autogenous fusion welded samples and samples fusion welded using filler metal were prepared. Mechanical testing, hardness testing, metallography, scanning electron microscopy, and corrosion testing were used to evaluate and compare the weld samples.

Mechanical and Hardness Test Results

Sub-size samples were tested at room temperature using standard tensile testing to determine the mechanical strength of the weld joints. Tensile specimens were machined with the center of the weld zone in the middle of the tensile gauge specimen. Specimens were tested according to ASTM E-8. Table 1 provides the tensile test results for several different sample welds. The results show that the inertia weld samples had higher ultimate strength and slightly lower yield strength than the fusion weld samples. Applying the above-described stress relief anneal to an inertia weld sample only slightly reduced the mechanical strength of the samples. In observing the actual tensile testing procedure, it was seen that all of the welded samples (both inertia and fusion welded) failed in the titanium parent metal, and not in the weld areas.

TABLE 1

| Type of Weld Joint | UTS ksi (MPa) | YS ksi (MPa) | Elongation %, min. |
|---|---|---|---|
| Zr/Ti Autogeneous | 71.8 (495) | 57.1 (394) | 17 |
| (no filler metal) | 70.4 (485) | 55.1 (380) | 12 |
| Zr/Ti Fusion Weld | 61.1 (421) | 44.0 (313) | 22 |
| (Zr Filler) | 60.9 (420) | 46.1 (318) | 20 |
| Zr/Ti Fusion Weld | 70.1 (483) | 53.1 (366) | 16 |
| (Ti Filler) | 70.6 (487) | 56.1 (387) | 16 |
| Zr/Ti Inertia Weld | 75.2 (519) | 51.8 (357) | 20 |
| (as-welded) | 76.4 (527) | 52.8 (364) | 15 |
|  | 71.5 (493) | 50.8 (350) | 5 |
| Zr/Ti/Inertia Weld | 74.6 (514) | 47.8 (330) | 16 |
| (stress relieved) | 74.9 (517) | 48.3 (333) | 28 |
|  | 74.5 (514) | 49.1 (339) | 19 |
| Wrought (non-welded) |  |  |  |
| Titanium Grade 2 ASTM Specification | 50 (345) min. | 40 (275) min. | 20 |
| Wrought (non-welded) Titanium Grade 3 ASTM Specification | 65 (450) min. | 55 (380) min. | 18 |
| Wrought (non-welded) Zirconium 702 ™ ASTM Specification | 55 (379) min. | 30 (207) min. | 16 |

Table 1 also lists the ASTM requirements for titanium Grade 2, titanium Grade 3, and Zr702. In the sample welds tested, the mechanical properties of each of the inertia welded tubes (stress relieved condition) met the requirements for Zr702 grade.

Hardness of the welded samples was evaluated beginning at the zirconium parent metal and across the weld to the titanium parent metal. The hardness testing was conducted to determine the extent of solid solution hardening in the zirconium to titanium fusion and inertia welds. Table 2 provides the hardness test results. Given that that an alloyed weld metal is not created during inertia welding, "N/A" is listed as the hardness of the weld metal for such samples. The results show that in the fusion weld samples the hardness of the weld metal was more than double that of either parent metal. This would contribute to the fusion welds' very poor bend ductility, and could result in premature failure of the weld. In contrast, the hardness of the heat affected zone of the tested inertia weld samples was only slightly elevated relative to the immediately adjacent parent metal. This contrast demonstrates a mechanical disadvantage resulting from the inherent creation of alloys in a fusion weld zone.

TABLE 2

| | Vickers Hardness (1 kg load) | | | | |
|---|---|---|---|---|---|
| Type of Weld Joint | Zirconium Parent Metal | Heat Affected Zone | Weld Metal | Heat Affected Zone | Titanium Parent Metal |
| Zr/Ti Autogeneous | 159 | 174 | 339 | 173 | 165 |
| No filler Metal | 158 | 163 | 339 | 180 | 160 |
|  | 164 | 174 | 348 | 168 | 167 |
| Zr/Ti Fusion Weld | 156 | 165 | 326 | 165 | 160 |
| with Zr Filler Metal | 149 | 163 | 330 | 176 | 159 |
|  | 153 | 172 | 339 | 168 | 161 |
| Zr/Ti Fusion Weld | 160 | 173 | 264 | 177 | 159 |
| with Ti Filler Metal | 163 | 174 | 279 | 167 | 154 |
|  | 166 | 178 | 254 | 174 | 166 |
| Zr/Ti Inertia Weld | 170 | 217 | N/A | 211 | 184 |
| (as-welded) | 173 | 217 | N/A | 199 | 181 |
|  | 175 | 209 | N/A | 197 | 185 |
| Zr/Ti Inertia Weld | 171 | 202 | N/A | 171 | 161 |
| (stress relieved) | 177 | 200 | N/A | 161 | 171 |
|  | 165 | 206 | N/A | 165 | 170 |

Corrosion Test Results

The sample welds were tested for corrosion resistance in a standard Huey test environment (65% nitric acid at a boiling temperature of 118° C. (244° F.)) according to ASTM specification A-262. The Huey test is commonly used to evaluate corrosion resistance of materials that will be exposed to nitric acid or urea environments. There were five 48-hour test periods, and new nitric acid was used after each test period. Nitric acid was replaced because the leaching and dissolution of $Ti^{+4}$ ions into the acid test solution will decrease the apparent corrosion rate of titanium in the test samples. Moreover, replacement of acid solution better simulates the dynamic conditions occurring in equipment such as heat exchangers, where acid is replenished continuously. The rate of corrosion of zirconium, however, is not affected by the presence of either titanium or zirconium ions in the nitric acid solution.

The weld samples were subjected to the test solution for a predetermined time and then evaluated for weight loss using standard corrosion rate calculations. The corrosion samples were visually and metallographically examined to determine whether the weld area was preferentially attacked. Table 3 provides the corrosion test results. As shown, the corrosion rate of the fusion welded samples exceeded 15 mils/year (mpy) (0.39 mm/year) for both the autogenous samples and those samples prepared with titanium filler metal. The fusion welded samples prepared with zirconium filler metal showed a significantly lower 5.7 mpy (0.15 mm/year) average corrosion rate, but examination of the weld interface showed a preferential attack in the area near the toe of the weld.

TABLE 3

| Test Period | Autogeneous Weld | Fusion Weld with Zirconium Filler Metal | Fusion Weld with Titanium Filler Metal | Inertia Welds As-Received | Inertia Welds Stress Relieved |
|---|---|---|---|---|---|
| | | | Corrosion rate mpy (mm/yr) | | |
| #1 | 15.4 (0.39) | 3.3 (0.08) | 19.6 (0.50) | 6.3 (0.16) | 6.2 (0.15) |
| | 17 (0.43) | 4.7 (0.12) | 35 (0.89) | | |
| #2 | 16.9 (0.43) | 4.7 (0.12) | 7.6 (0.19) | 0.6 (0.015) | .4 (0.01) |
| | 19.4 (0.49) | 5.7 (0.15) | 25 (0.63) | | |
| #3 | 19.5 (0.49) | 6.1 (0.15) | 9.2 (0.23) | 0 | GW |
| | 22.2 (0.56) | 7.1 (0.18) | 21.5 (0.55) | | |
| #4 | 17.7 (0.45) | 5.4 (0.14) | 9.2 (0.23) | 0.9 (0.023) | 0.8 (0.021) |
| | 18 (0.46) | 6.5 (0.16) | 19.7 (0.50) | | |
| #5 | 18.4 (0.47) | 5.6 (0.14) | 8.1 (0.21) | GW | 0 |
| | 16 (0.41) | 8.2 (0.21) | 19.3 (0.49) | | |
| Avg. | 18 (0.46) | 5.7 (0.15) | 17.4 (0.44) | 1.6 (0.04) | 1.5 (0.038) |

GW = gained weight

In general, the results in Table 3 show that the fusion welded samples would be less suitable than the inertia welded samples in high temperature/high pressure conditions because of the fusion welded samples' relatively high corrosion rates. Visual examination of the fusion welded corrosion samples with autogenous welds revealed the presence of a white corrosion film on the titanium parent metal, which was easily removed. A heavy white oxide also was noted on the titanium side of the weld, which was initially easily removed but became more tenacious as the test duration increased. General corrosion was found over the regions of the autogenous weld area where no white oxide was found. Visual examination of the fusion welded corrosion samples formed with zirconium filler metal revealed that the welds apparently were unaffected by a discolored oxide film. The titanium side was a dark gray with a thin white line at the fusion line of the weld. Heavier corrosion was found on the fusion line on the zirconium side of the weld. Visual inspection of the fusion welded corrosion sample using titanium filler metal revealed that the weld area was completely covered by a hard white layer (oxide) deposit. The titanium side of the weld deposit was gray in color, but was lighter in color than the zirconium side. Titanium formed an easily removed light gray/white film on the samples over each of the test periods. The calculated average corrosion rate considerably differed between the two test trials.

The significant difference in the corrosion test results for the zirconium to titanium fusion weld samples using zirconium filler metal relative to the zirconium to titanium fusion weld samples using titanium filler metal (or the autogenous weld samples) are believed largely due to the zirconium alloys' higher corrosion resistance relative to the titanium alloys' resistance. Also, the zirconium filler metal covered most of the welded area. Therefore, the 5.7 mpy (0.15 mm/year) corrosion rate was at least in part due to the area of the toe of the weld where the alloying in the weld region took place.

It is difficult to evaluate erosion characteristics in the laboratory. In general, however, titanium is known to be less erosion resistant than zirconium. As such, providing equipment with original or replacement fluid conducting parts primarily fabricated from zirconium rather than titanium, or including a zirconium inner layer in addition to other layers, as according to one aspect of the present disclosure, should inhibit erosion. In addition, providing a co-extruded multi-layer tube including an inner liner of zirconium as described above, wherein the tube end is solid state welded to a zirconium tube portion, would protect the entire length of a stripper tube from both erosion and corrosion.

Metallographic and Microscopic Examination

Figure 8:
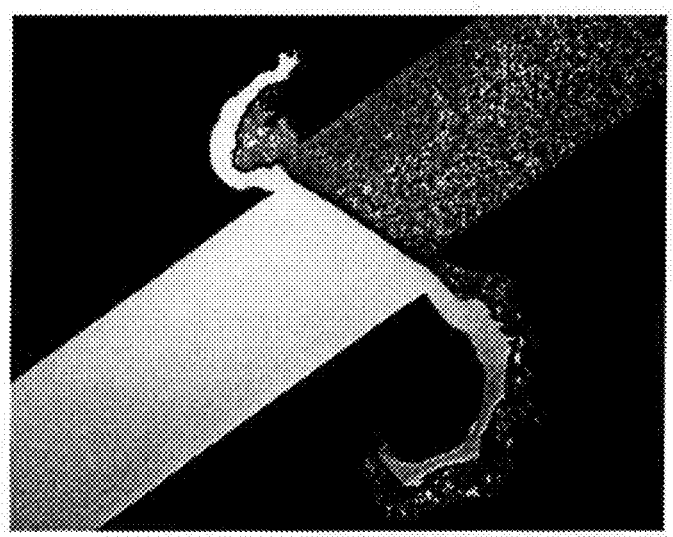
FIG. 8 is a photograph of a cross-section of a zirconium to titanium weld interface in the tube wall of an inertia welded sample according to an aspect of the present disclosure.
Figure 9:
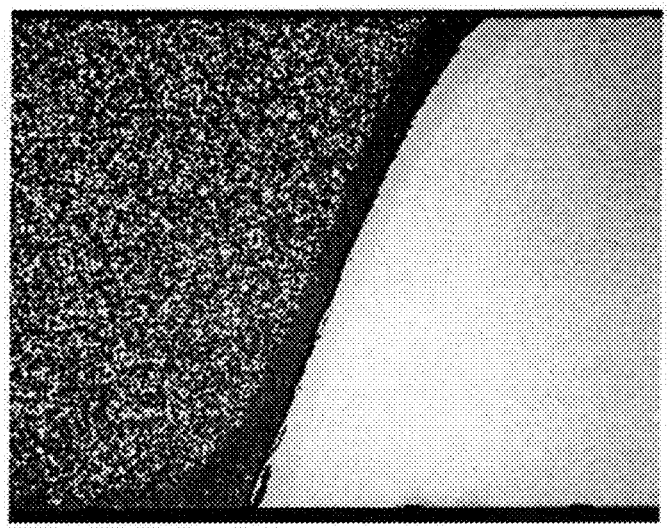
FIG. 9 is a high magnification view of the weld interface shown in FIG. 8.

Metallography was used to examine the characteristics of the zirconium-to-titanium weld interfaces. FIG. 8 is a cross-section of the zirconium to titanium weld interface in the tube wall of an inertia welded sample. The flash material is shown sweeping out of the weld joint, but the interface between the dissimilar metals is bright and distinct. FIG. 9 is a high magnification view of the same weld interface. The darkened zone of each of the metals, adjacent the weld joint, is the heat affected zone. The darkening is caused by heat input at the bond interface and is not due to alloying. Even at high magnification, the interface between the zirconium and titanium metals is bright and distinct and shows no evidence of alloying.

Figure 10:
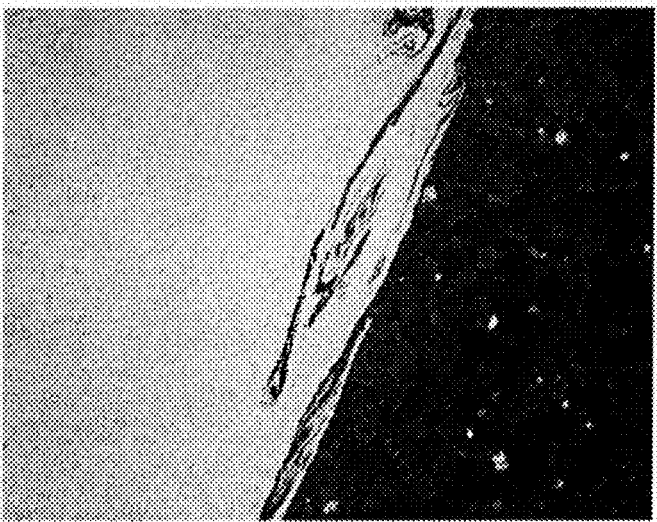
FIG. 10 is a high magnification image of a portion of the weld interface region shown in FIG. 9.

To better characterize the weld interface of the inertia weld, scanning electron microscopy (SEM) was used. SEM was used to better investigate whether alloying occurred on any scale in the interface region and to assess whether any areas were present in which the two metals were not totally bonded. FIG. 10 is a high magnification SEM image of the interface region that was previously metallographically inspected. No alloyed regions are apparent in the image. Energy dispersive X-ray analysis of the interface of the same sample confirmed the absence of alloyed regions within the inertia weld interface. Instead, the bonding region between the two metals included a mechanical mixture, or swirl, of pure zirconium and pure titanium.

General Observations from Testing

Thus, the above test results show that the zirconium to titanium inertia welded samples performed much better than the fusion welded samples in terms of mechanical properties and corrosion resistance, and the inertia welded samples appeared to be substantially free of alloyed regions within the weld zone. No obvious corrosive attack was noted in the inertia welded samples as was seen in the fusion welded samples. The fusion welded samples had a high corrosion rate exceeding 15 mpy (0.38 mm/year), while the inertia weld exhibited a corrosion rate less than 2 mpy (0.05 mm/year) in testing done to evaluate corrosion resistance in nitric acid and urea environments.

Example 2—Fabrication of Multi-Layer Tube

One embodiment for metallurgically bonding dissimilar reactive metals such as, for example, titanium and zirconium, to form a multi-layer, fluid conducting member involves three distinct process routes. The first process route is directed to fabricating an outer billet, or base component. The second process route is directed to fabricating an inner liner component. In the third process route, the base component and the liner component are combined into an assembled billet, and the billet is then extruded, cold worked, and heat treated to provide the multi-layer tube. In the following paragraphs, the three process routes are described in greater detail as specifically applied in the production of multi-layer tubing including a titanium Grade 3 (UNS R50550) outer base and a Zircadyne 702™ (Zr702) (UNS R60702) inner liner. Zr702 alloy is available from ATI Wah Chang, Albany, Oreg., and has the following chemistry (in weight percentages of total alloy weight): 99.2 min. zirconium+hafnium; 4.5 max. hafnium; 0.2 max. iron+chromium; 0.005 max. hydrogen; 0.25 max. nitrogen; 0.05 max. carbon; and 0.16 max. oxygen.

Figure 11:
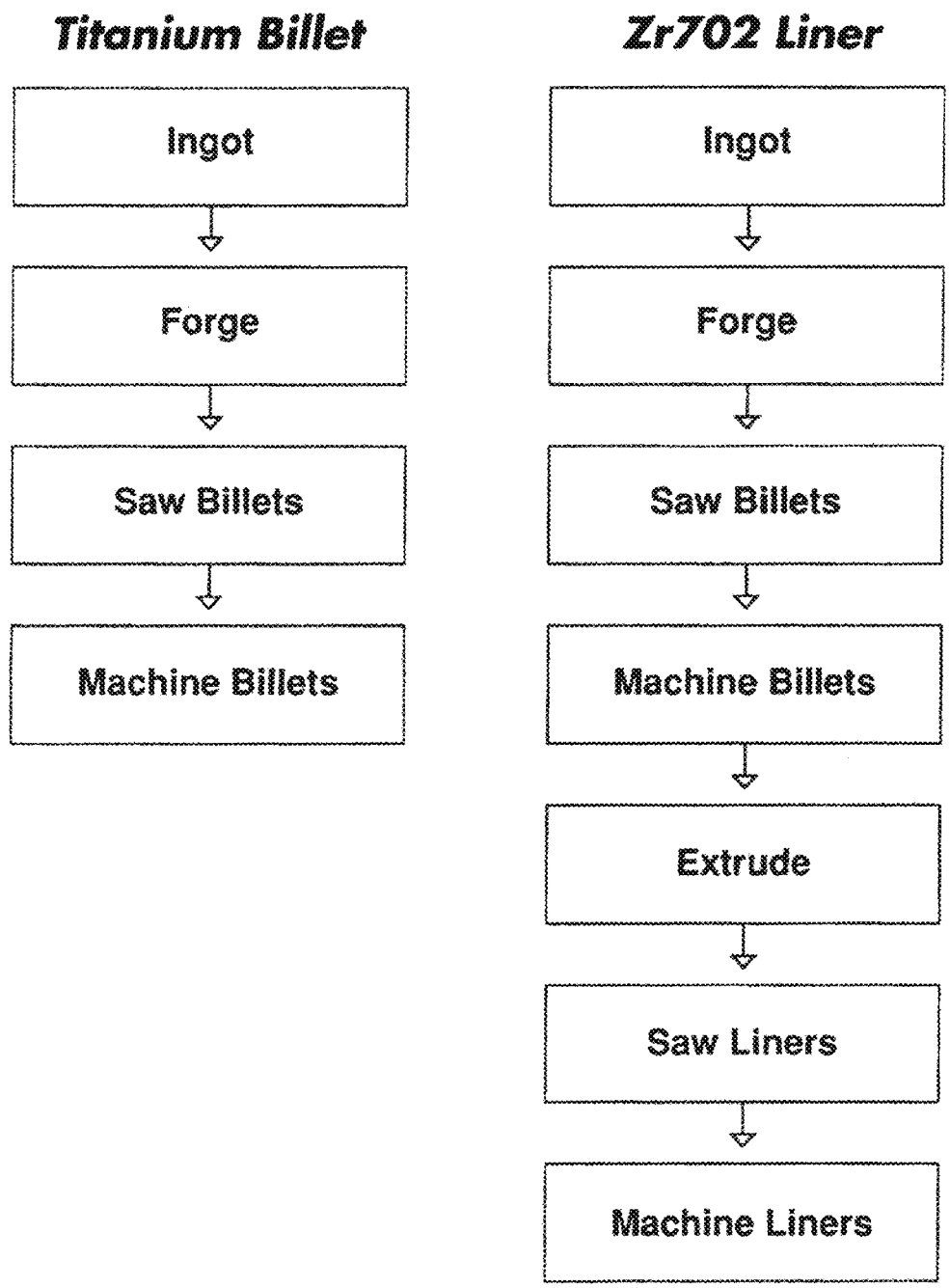
FIGS. 11 and 12 are schematic representations of steps of an embodiment of a process according to the present disclosure for fabricating a multi-layer fluid conducting part or part section.

Steps included in the first process route are shown schematically on the left-hand side of FIG. 11. Titanium Grade 3 (TiGr3) was cast into an ingot using conventional consumable electrode vacuum-arc melting techniques. The ingot was heated in the beta-phase field and forged to an intermediate diameter, followed by subsequent reductions in the alpha and alpha+beta phase fields to provide a cylindrical forging with a diameter of approximately 210 mm (8.27 inches). The forging was sawed into individual billets. Each billet was machined to provide a hollow, cylindrical billet having approximate dimensions of 201 mm (7.91 inches) outer diameter and 108 mm (4.26 inches) inner diameter. To better ensure acceptable metallurgical bonding between the cylindrical TiGr3 billet and the zirconium inner liner, the inner diameter of the TiGr3 billet was machined to a surface roughness of 63 micro-inches (0.0016 mm) RA maximum. A relatively smooth surface finish better ensures adequate cleaning in the peaks and grooves of the surface roughness profile. The absence of significant grooves and scratches on the surface better ensures formation of a continuous metallurgical bond between base and liner components that does not suffer from delaminations.

Steps in the second process route are shown schematically on the right-hand side of FIG. 11. This route relates to fabricating the Zr702 alloy inner liner of the multi-layer tube. Zr702 alloy was cast into an ingot and forged in a manner similar to the TiGr3 alloy above. The liner was machined from a 115 mm (4.53 inches) diameter cylindrical forging. (In one non-limiting alternative arrangement, liners may be formed by extruding an oversize tube and then sawing individual liners for subsequent machining.) The machined Zr702 alloy liner was approximately 108 mm (4.26 inches) outer diameter×54 mm (2.13 inches) inner diameter, with an outer diameter surface roughness of 63 micro-inches (0.0016 mm) RA maximum. The outer diameter surface roughness was maintained within such limits for the purposes mentioned above with respect to the surface roughness of the TiGr3 cylindrical billet inner diameter. The liner was match machined with precise tolerances to slip within the TiGr3 billet. A preferred tolerance for the gap between the inner diameter of the base and the outer diameter of the liner is about 0.25 mm (about 0.010 inch).

Figure 12:
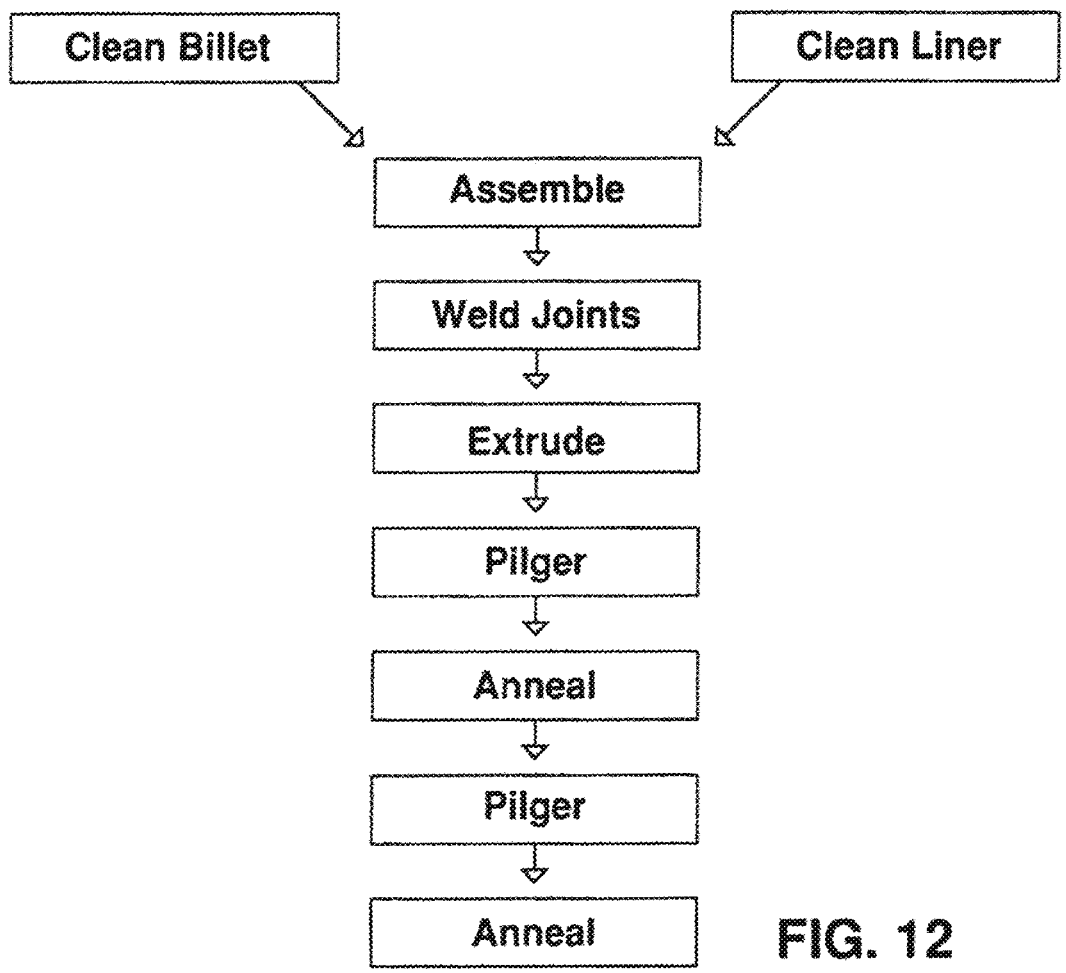

In the third process route, shown schematically in FIG. 12, the TiGr3 outer component and the Zr702 alloy liner component were assembled into a billet and then metallurgically bonded and reduced into smaller diameter multi-layer tubing. Before assembly, the outer component and liner component were cleaned by ice blasting to remove foreign contamination, such as dirt and oil. Clean surfaces are important so as to from a high-quality metallurgical bond.

Figure 13:
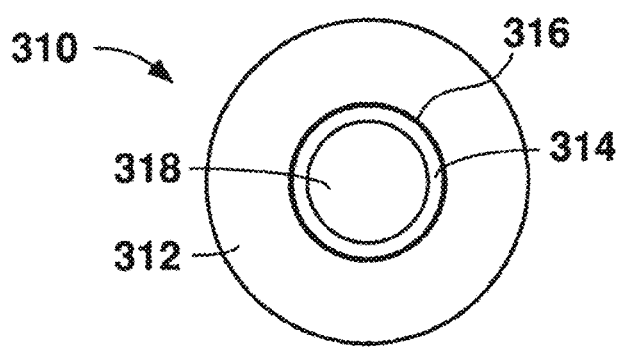
FIG. 13 illustrates an end view of a welded bi-layer billet made as an intermediate article in one of the process steps included in FIG. 12.

The cleaned and dried billet and liner components were slipped together into an assembled billet. The billet's end joints were welded in a vacuum of at least $1 \times 10^{-3}$ torr (0.133 Pa) using an electron beam gun. The electron beam was focused on the end joints to produce a weld with a penetration of 10 to 40 mm into the billet and with a weld width of at least 5 mm. Weld integrity is important to preventing the atmosphere from contaminating and inhibiting formation of the metallurgical bond during extrusion of the assembled billet. FIG. 13 schematically shows an end view of the welded assembled billet 310, wherein 312 is the TiGr3 outer base component, 314 is the Zr702 alloy inner liner component, 316 is the weld zone including a mixture including titanium and zirconium, and 318 is the cylindrical fluid conducting void passing through the billet.

Any weld splatter was ground off the welded assembled billet. The billet was then induction heated in a cylindrical coil to 650-775° C. (1202-1427° F.), with an aim of 700° C. (1292° C.) and transferred to a 3500 ton Lombard hydraulic extrusion press. The billet was placed in a cylindrical container with a mandrel inserted into the inner diameter of the liner components to establish the extruded inner diameter size. A stem on the extrusion press pushed the billet through a conical die using upset pressure of about 1500 tons ($8.896 \times 10^3$ N) to extrude the billet into a seamless multi-layer tube. The extrusion elongation ratio was approximately 11:1, and the aim was to provide an extruded tube having 3.100 inches (78.74 mm) outer diameter and a wall thickness of about 0.525 inch (13.4 mm). The dissimilar metals interacted and were metallurgically bonded upon extrusion as a result of conditions including process temperature, time-at-temperature, pressure, and cleanliness of the mating surfaces. Several inches of the lead end and tail end of the metallurgically bonded multi-layer extrusion were removed by sawing to ensure uniform liner thickness in the remaining portion.

The extruded tube was pickled in HF/nitric acid for a time sufficient to remove 0.001-0.002 inch (0.0254-0.508 mm) per wall. The tube was then cold worked on a pilger mill to further reduce tube diameter and wall thickness. In the pilger mill, the tube was rolled lengthwise by grooved, tapered dies that pressed the material over a similarly tapered mandrel. The tube was fed into the dies and rotated around its longitudinal axis to substantially uniformly reduce the entire circumference of the tube during each stroke of the mill. The multi-layer tube was reduced using a first pass on the pilger mill to an intermediate size of 44.5 mm (1.75 inches) outer diameter and 6.3 mm (0.25 inch) wall thickness. The rocked tube was cleaned using an alkaline cleaner, water rinse, and a pickle in 70% nitric acid, and then heat treated by vacuum anneal to recrystallize and soften the material. The heat treatment included annealing the tube at a temperature of 621±28° C. (1150±50° F.) for 1-2 hours. Other possible anneal regimens include heating at other temperatures in the range 500° C. (932° F.) to 750° C. (1382° F.) for 1-12 hours. The heat treatment should be adapted to minimize growth of intermetallic particles or compositional gradients that are harder and more brittle than the base and liner alloys. A brittle and/or wide diffusion zone can lead to delaminations of the tube layers.

Figure 14:
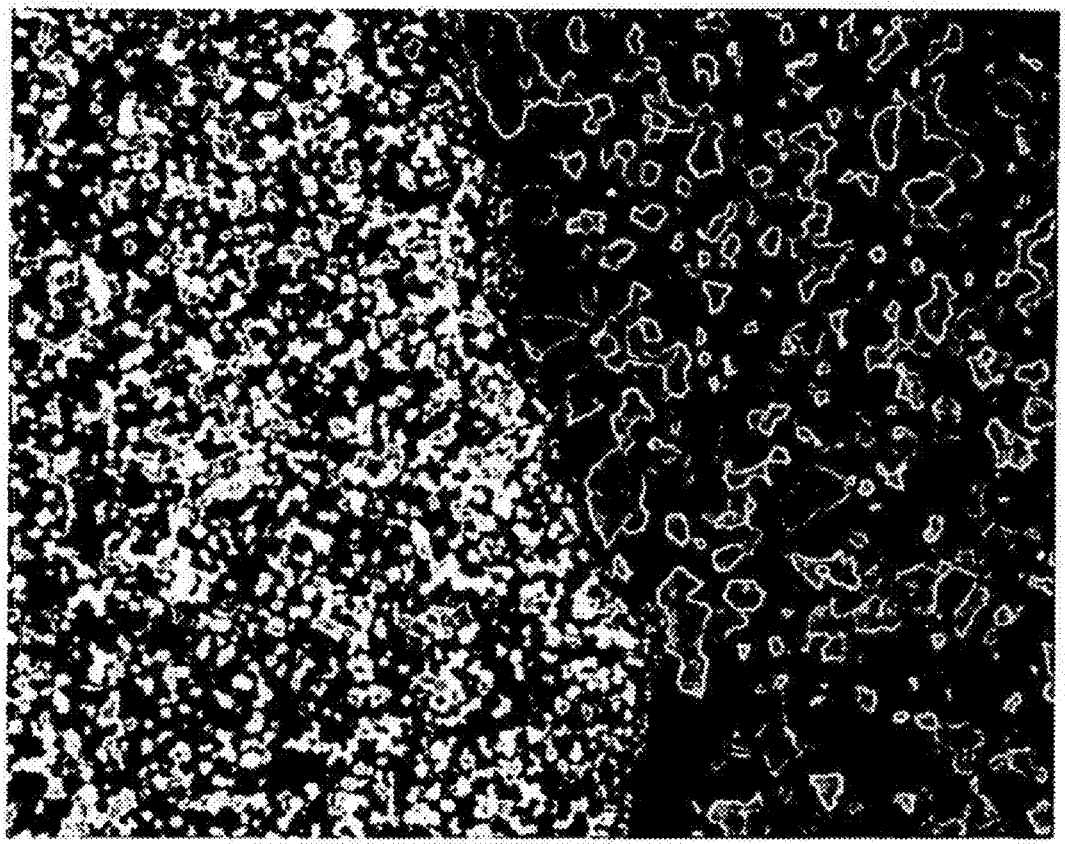
FIG. 14 is a photomicrograph of the metallurgical bond region of a heat treated multi-layer tube made by an embodiment of a method according to the present disclosure.

Subsequent to annealing, the tube was pickled in 70% nitric acid to remove any vacuum anneal stain, and then rotary straightened. The tube was then re-heated and subjected to a second pilger pass to reduce the tube to final dimensions of 27.0 mm (1.06 inch) outer diameter and 3.5 mm (0.138 mm) wall thickness. The final zirconium liner thickness was approximately 0.9 mm (0.035 inch). FIG. 14 is a micrograph of the metallurgical bond region of one of the multi-layer tubes made by the process. The image shows a fine grain structure (which should provide substantially uniform mechanical properties) and a continuous metallurgical bond between the titanium and zirconium layers. The metallurgical bond prevents the type of crevice corrosion seen in the known mechanically bonded (snug fit) tube designs.

The mechanical strength of TiGr3/Zr702 alloy multi-layer tubes made using the process in this example were evaluated and compared with properties of a TiGr3 mono-tube. The properties of 27.0 mm outer diameter×3.5 mm inner diameter samples of each tube type are shown in Table 4 below. The mechanical properties are similar, which shows that the Zircadyne® 702 liner does not significantly degrade the evaluated mechanical properties of the TiGr3 base material.

TABLE 4

| Tube Type | Sample | UTS ksi (MPa) | YS ksi (MPa) | Elongation (%, min.) |
|---|---|---|---|---|
| T-Gr3/Zircadyne 702 ™ | 1 | 77.9 (537) | 59.5 (410) | 32 |
| Multi-layer Tube | 2 | 81.6 (562) | 59.6 (411) | 35 |
| TiGr3 Mono-Tube | 1 | 80.1 (552) | 63.3 (436) | 37 |
| | 2 | 81 (558) | 61.1 (421) | 35 |

Portions of a tube formed by the method described in the present example can be solid state welded to the ends of a length of fluid conducting tube composed of zirconium or some other corrosion resistant metal or alloy to form a composite tube suitable for use in retrofitting the stripper of urea synthesis equipment. In such case, as described above, the material of the multi-layer tube's outer layer may be selected so that fusion welding the outer layer to the tubesheet will not result in significant reduction in the corrosion resistance of the weld region. For example, the TiGr3/Zr702 alloy multi-layer tube made in the present example would be particularly advantageous for use in retrofitting a stripper including a titanium-clad tubesheet.

Multi-layer tubes and other fluid conducting parts made by the present example also may be used without being solid state welded to a mono-layer fluid conducting part. In certain of such embodiments, the material of the outer layer of the multi-layer tube or other part may be selected so that when that material is fusion welded to a tubesheet or other mounting portion of the equipment, no problematic alloys are produced that would substantially negatively impact on the corrosion resistance, mechanical, or other important properties of the tube/part or mounting portion.

Of course, it will be understood that although the present discussion has focused on use of the multi-layer tubing formed in the present example in a stripper apparatus, the tubing also may be used as a fluid conducting part in other apparatus, including, for example, other chemical process equipment, heat exchangers, and any other equipment noted herein.

It is to be understood that the present description illustrates those aspects relevant to a clear understanding of the disclosure. Certain aspects that would be apparent to those skilled in the art and that, therefore, would not facilitate a better understanding have not been presented in order to simplify the present disclosure. Although the present disclosure has been described in connection with certain embodiments, those of ordinary skill in the art will, upon considering the foregoing disclosure, recognize that many modifications and variations may be employed. It is intended that the foregoing description and the following claims cover all such variations and modifications.

What is claimed is:

1. A method for making a tube, the method comprising:
providing a hollow first cylinder comprising zirconium or a zirconium alloy, the first cylinder having an outer surface;
providing a hollow second cylinder comprising titanium or a titanium alloy, the second cylinder having an inner surface, wherein the first cylinder can fit within the second cylinder;
positioning the first cylinder within the second cylinder, wherein the outer surface of the first cylinder opposes the inner surface of the second cylinder;
welding together end joints between the first cylinder and the second cylinder to provide a multi-layer billet;
induction heating the multi-layer billet to an extrusion temperature;
extruding the heated multi-layer billet, thereby metallurgically bonding the outer surface of the first cylinder to the inner surface of the second cylinder, and providing a tube having a wall comprising an inner layer comprising zirconium or a zirconium alloy metallurgically bonded to an outer layer comprising titanium or a titanium alloy; and
cold working the tube to reduce the wall thickness and/or diameter of the tube.

2. The method of claim 1, wherein the tube lacks an interdiffusion layer between the inner layer and the outer layer.

3. The method of claim 1, wherein the tube lacks intermetallic compounds and alloying in the metallurgical bond between the inner layer and the outer layer.

4. The method of claim 1, wherein cold working the tube comprises cold pilgering the tube.

5. The method of claim 1, wherein cold working the tube comprises cold pilgering the tube to a reduction in area of 20% to 90%.

6. The method of claim 1, wherein cold working the tube comprises cold drawing the tube.

7. The method of claim 1, further comprising heat treating the tube after extruding the multi-layer billet and/or after cold working the tube.

8. The method of claim 7, wherein heat treating the tube comprises annealing the tube at a temperature in the range of 500° C. to 750° C. for 1 to 12 hours.

9. The method of claim 1, wherein cold working the tube comprises at least two cold pilgering passes, wherein the tube is annealed at a temperature in the range of 500° C. to 750° C. for 1 to 12 hours after each pilgering pass and before any subsequent pilgering pass.

10. The method of claim 1, comprising extruding the billet in an extrusion apparatus comprising an extrusion ram that is advanced at a rate in the range of 50 mm/minute to 900 mm/minute during an extrusion cycle.

11. The method of claim 1, comprising extruding the billet at an extrusion ratio in the range of 3:1 to 30:1.

12. The method of claim 1, wherein the multi-layer billet is induction heated to a temperature in the range of 550° C. to 900° C.

13. The method of claim 1, wherein the end joints are welded together with an electron beam weld.

14. The method of claim 13, wherein the electron beam weld penetrates the end joints to a depth ranging from 5 mm to 50 mm.

15. The method of claim 1, further comprising reducing surface roughness of at least one of the outer surface of the first cylinder and the inner surface of the second cylinder to no greater than 63 micro-inches RA before positioning the first cylinder within the second cylinder.

16. The method of claim 1, further comprising ice blasting at least one of the outer surface of the first cylinder and the inner surface the second cylinder by propelling crystalline water against the surface(s), thereby mechanically scrubbing and liquid flushing the surface(s).

17. The method of claim 1, further comprising inertia welding a zirconium or zirconium alloy tube segment to the tube having a wall comprising an inner layer comprising zirconium or a zirconium alloy metallurgically bonded to an outer layer comprising titanium or a titanium alloy.

18. A method for making a tube, the method comprising:
providing a hollow first cylinder comprising zirconium, a zirconium alloy, hafnium, a hafnium alloy, vanadium, a vanadium alloy, niobium, a niobium alloy, tantalum, or a tantalum alloy, the first cylinder having an outer surface;
providing a hollow second cylinder comprising stainless steel, titanium, or a titanium alloy, the second cylinder having an inner surface, wherein the first cylinder can fit within the second cylinder;
positioning the first cylinder within the second cylinder, wherein the outer surface of the first cylinder opposes the inner surface of the second cylinder;
welding together end joints between the first cylinder and the second cylinder to provide a multi-layer billet;
heating the multi-layer billet to an extrusion temperature;
extruding the heated multi-layer billet, thereby metallurgically bonding the outer surface of the first cylinder to the inner surface of the second cylinder, and providing a tube having a wall comprising an inner layer metallurgically bonded to an outer layer; and
cold working the tube to reduce the wall thickness and/or diameter of the tube.

19. The method of claim 18, wherein cold working the tube comprises cold pilgering the tube to a reduction in area of 20% to 90%.

20. The method of claim 18, further comprising annealing the tube at a temperature in the range of 500° C. to 750° C. for 1 to 12 hours, wherein the annealing is performed after extruding the multi-layer billet and/or after cold working the tube.

21. The method of claim 18, comprising extruding the billet at an extrusion ratio in the range of 3:1 to 30:1 in an extrusion apparatus comprising an extrusion ram that is advanced at a rate in the range of 50 mm/minute to 900 mm/minute during an extrusion cycle.

22. The method of claim 18, wherein the multi-layer billet is induction heated to a temperature in the range of 550° C. to 900° C.

23. The method of claim 18, wherein the end joints are welded together with an electron beam weld that penetrates the end joints to a depth ranging from 5 mm to 50 mm.

24. The method of claim 18, further comprising reducing surface roughness of at least one of the outer surface of the first cylinder and the inner surface of the second cylinder to no greater than 63 micro-inches RA before positioning the first cylinder within the second cylinder.

25. The method of claim 18, further comprising ice blasting at least one of the outer surface of the first cylinder and the inner surface the second cylinder by propelling crystalline water against the surface(s), thereby mechanically scrubbing and liquid flushing the surface(s).

26. A method for replacing a tube in chemical processing equipment, the method comprising:
providing a tube made in accordance with the method of claim 1; and
fusion welding the tube to a tubesheet in the chemical processing equipment.

27. The method of claim 26, wherein the chemical processing equipment comprises a urea stripper, a heat exchanger, or a condenser.

* * * * *